(12) United States Patent
Perlina et al.

(10) Patent No.: US 12,022,853 B2
(45) Date of Patent: *Jul. 2, 2024

(54) PERSONALIZED NUTRITIONAL SUPPLEMENTS AND METHODS OF MAKING

(71) Applicant: Viome Life Sciences, Inc., Bellevue, WA (US)

(72) Inventors: Alla Perlina, San Diego, CA (US); Tiep Ba Le, Santa Clara, CA (US); Grant Antoine, Seattle, WA (US); Guru Banavar, New York, NY (US); Hilary Keiser, Kirkland, WA (US); Eric Patridge, New Rochelle, NY (US)

(73) Assignee: VIOME LIFE SCIENCES, INC., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,507

(22) Filed: Mar. 29, 2022

(65) Prior Publication Data
US 2022/0248735 A1 Aug. 11, 2022

Related U.S. Application Data

(63) Continuation of application No. PCT/US2021/065823, filed on Dec. 31, 2021.

(60) Provisional application No. 63/132,986, filed on Dec. 31, 2020.

(51) Int. Cl.
| | |
|---|---|
| *A23L 33/15* | (2016.01) |
| *A23L 33/135* | (2016.01) |
| *A23L 33/175* | (2016.01) |
| *G06F 16/2457* | (2019.01) |
| *G06F 16/28* | (2019.01) |

(52) U.S. Cl.
CPC .............. *A23L 33/15* (2016.08); *A23L 33/135* (2016.08); *A23L 33/175* (2016.08); *G06F 16/24578* (2019.01); *G06F 16/285* (2019.01)

(58) Field of Classification Search
CPC .................................................. A23L 33/135
See application file for complete search history.

(56) References Cited

U.S. PATENT DOCUMENTS

| | | | |
|---|---|---|---|
| 10,201,551 B2 | 2/2019 | Rathmacher et al. | |
| 11,783,726 B2 | 10/2023 | Banavar et al. | |
| 2011/0014351 A1* | 1/2011 | Reider .................... | G16H 10/20 53/473 |
| 2013/0121968 A1* | 5/2013 | Quay ...................... | C12Q 1/689 435/252.4 |
| 2016/0219912 A1 | 8/2016 | Sung | |
| 2021/0035289 A1* | 2/2021 | Zedayko .................. | A61B 5/42 |

FOREIGN PATENT DOCUMENTS

| | | | |
|---|---|---|---|
| CN | 105711864 A | * | 6/2016 |
| JP | 2005267360 A | * | 9/2005 |
| KR | 20200003366 A | | 1/2020 |
| WO | 2018128510 A1 | | 7/2018 |
| WO | 2018160899 A1 | | 9/2018 |
| WO | 2020168015 A1 | | 8/2020 |

OTHER PUBLICATIONS

Mouradian, N., "Check out this unique packaging for traditional Chinese medicine", Dieline, Aug. 15, 2018, printed from https://thedieline.com/blog/2018/8/1/entrepeneur? on Jun. 8, 2022. (Year: 2018).*
Wang, X. et al. "Impact of Qi-invigorating traditional Chinese medicines on intestinal flora: A basis for rational choice of prebiotics", Chin J Nat MEd 2017, 15 (4); 241-254. (Year: 2017).*
Lin et al. "Development of an automatic dispensing system for traditional Chinese herbs", J of Healthcare Engineering, vol. 2017, Article ID 9013508, https://doi.org/10.1155/2017/9013508. (Year: 2017).*
Time Out KL editors, "Traditional Chinese medicine halls in KL", Aug. 24, 2016, timeout.com, printed from https://www.timeout.com/kuala-lumpur/shopping/traditional-chinese-medicine-halls-in-kl on Jun. 8, 2022. (Year: 2016).*
Yi, Y. et al. "An overview of traditional Chinese herbal formulae and a propose of a new code system for expressing the formula titles", eCAM 2004; 1(2) 125-132, doi:10.1093/ecam/neh019. (Year: 2004).*
Zhu, Y. et al., "Traditional Chinese herbal medicine" Pharm World Sci 1995; 17 (4): 103-112. (Year: 1995).*
Erom Probiotic+, available on or before Jul. 31, 2020, printed on May 6, 2023 from https://www.erom-usa.com/erom-probiotic.html.*
Wink, David et al. Nitric oxide and redox mechanisms in the immune response, J Leukoc Biol. Jun. 2011; 89(6): 873-891.
Yamamoto, Hirotaka et al., Amla Enhances Mitochondrial Spare Respiratory Capacity by Increasing Mitochondrial Biogenesis and Antioxidant Systems in a Murine Skeletal Muscle Cell Line, Hindawi Publishing Corporation Oxidative Medicine and Cellular Longevity, vol. 2016, Article ID 1735841, 11 pages.
Yan, Fang et al. Soluble Proteins Produced by Probiotic Bacteria Regulate Intestinal Epithelial Cell Survival and Growth, Gastroenterology. Feb. 2007; 132(2): 562-575.
Yoshii, Ken et al. Metabolism of Dietary and Microbial Vitamin B Family in the Regulation of Host Immunity, Apr. 17, 2019, vol. 6, Article 48, 12 pages.
Yousefzadeh, Matthew J. et al. Fisetin is a senotherapeutic that extends health and lifespan, EBioMedicine, 36 (2018) 18-28.
Abou-Hamdan, Mhamad et al. Pantethine Down-Regulates Leukocyte Recruitment and Inflammatory Parameters in a Mouse Model of Allergic Airway Inflammation, Animal Studies, Med Sci Monit Basic Res, 2017; 23: 368-372.

(Continued)

*Primary Examiner* — Gina C Justice
(74) *Attorney, Agent, or Firm* — Naira Simmons; Pierson Ferdinand, LLP

(57) ABSTRACT

A method of preparing personalized supplement packages for a subject involves identifying one or a plurality of suboptimal wellness categories in the subject, rank ordering ingredients in terms of their utility score to the suboptimal conditions, and filling a total package amount with target doses of ingredients added in rank order until the total package amount is filled.

34 Claims, 9 Drawing Sheets

(56) References Cited

OTHER PUBLICATIONS

Babiker Rasha, et al. Effects of gum Arabic ingestion on body mass index and body fat percentage in healthy adult females: two-arm randomized, placebo controlled, double-blind trial, Nutrition Journal Babiker et al. Nutrition Journal 2012, 7 pages.
Bartosch, Sabine et al. Microbiological Effects of Consuming a Synbiotic Containing Bifidobacterium bifidum, Bifidobacterium lactis, and Oligofructose in Elderly Persons, Determined by Real-Time Polymerase Chain Reaction and Counting of Viable Bacteria, 1Microbiology and Gut Biology Group, and 2Section of Ageing and Health, University of Dundee, Dundee, United Kingdom, 14 pages.
Bogicevic, Biljana, et al. Cysteine biosynthesis in Lactobacillus casei: identification and characterization of a serine acetyltransferase, FEMS Microbiology Letters, 363, 2016, 7 pages.
Bouhnik, Yoram et al. Short-Chain Fructo-Oligosaccharide Administration Dose-Dependently Increases Fecal Bifidobacteria in Healthy Humans, Human Nutrition and Metabolism, 1999 American Society for Nutritional Sciences, 4 pages.
Canto, Carles et al. The NAD+ precursor nicotinamide riboside enhances oxidative metabolism and protects against high-fat diet induced obesity, The NAD+ precursor nicotinamide riboside enhances oxidativemetabolism and protects against high-fat diet induced obesity.
Capili Bernadette et al. Addressing the Role of Food in Irritable Bowel Syndrome Symptom Management, J Nurse Pract. May 2016; 12(5): 324-329.
Catanzaro, Daniela et al., Boswellia serrata Preserves Intestinal Epithelial Barrier from Oxidative and Inflammatory Damage, PLOS One, 2015, 15 pages.
Chedid, Victor et al. Herbal Therapy Is Equivalent to Rifaximin for the Treatment of Small Intestinal Bacterial Overgrowth, Original Research, Global Advances in Health and Medicine, vol. 3, No. 3, May 2014, 9 pages.
Cheng, Xian et al., "Punicalagin induces senescent growth arrest in human papillary thyroid carcinoma BCPAP cells via NF-κB signaling pathway," Biomedicine & Pharmacotherapy, 103 (2018) 490-498.
Cherbut, Christine et al. Acacia Gum is a Bifidogenic Dietary Fibre with High Digestive Tolerance in Healthy Humans, Microbial Ecology in Health and Disease, 2003, 8 pages.
Chowanadisai, Winyoo et al. Pyrroloquinoline Quinone Stimulates Mitochondrial Biogenesis through cAMP Response Element-binding Protein Phosphorylation and Increased PGC-1 Expression, The Journal of Biological Chemistry vol. 285, No. 1, pp. 142-152, Jan. 1, 2010.
Colom Joan, et al. Presence and Germination of the Probiotic Bacillus subtilis DE111® in the Human Small Intestinal Tract: A Randomized, Crossover, Double-Blind, and Placebo-Controlled Study, Microbiology, Aug. 2021, vol. 12, 7 pages.
Cooper, Robert et al. Creatine supplementation with specific view to exercise/sports performance: an update, Journal of the International Society of Sports Nutrition 2012, 9:33, 11 pages.
Crycova, Lenka, ATP and magnesium drive conformational changes of the Na+/K+-ATPase cytoplasmic headpiece, Biochimica et Biophysica Acta 1788 (2009) 1081-1091.
Cuentas, Ann Maria et al. The Effect of Bacillus subtilis DE111 on the Daily Bowel Movement Profile for People with Occasional Gastrointestinal Irregularity, Journal of Probiotics & Health, Cuentas et al., J Prob Health 2017, 5:4, 4 pages.
Engelbrektson, Anna et al. Probiotics to minimize the disruption of faecal microbiota in healthy subjects undergoing antibiotic therapy, Journal of Medical Microbiology (2009), 58, 663-670.
Gao Hong, et al. "The Role of Zinc and Zinc Homeostasis in Macrophase Function," Journal of Immunology Research, vol. 2018, ARticle ID 6872621, 11 pages, Hindwai, 12 pages.
Gowayed, Mennatallah A. et al. Enhanced mitochondrial biogenesis is associated with the ameliorative action of creatine supplementation in rat soleus and cardiac muscles, Experimental and Therapeutic M 384 edicine 19: 384-392, 2020.
Grunz-Borgmann, Elizabeth et al. Ashwagandha attenuates TNF-α- and LPSinduced NF-κB activation and CCL2 and CCL5 gene expression in NRK-52E cells, Grunz-Borgmann et al. BMC Complementary and Alternative Medicine (2015) 15:434.
Hazewindus, Merel et al. Protection against Chemotaxis in the Anti-Inflammatory Effect of Bioactives from Tomato Ketchup, PLOS ONE, Dec. 31, 2014, 15 pages.
Hojyo, Shintaro, et al. "Roles of zinc signaling in the immune system," Hindawi Publishing Corporation, Journal of Immunology Research vol. 2016, Article ID 6762343, 21 pages.
Imran, Muhammad, et al. Lycopene as a Natural Antioxidant Used to Prevent Human Health Disorders, Antioxidants 2020, 9, 706.
International Search Report and Written Opinion for PCT/US21/65823 dated Jun. 8, 2022; 10 pages.
Jang, Se-Eun, et al. Lactobacillus rhamnosus HN001 and Lactobacillus acidophilus La-14 Attenuate Gardnerella vaginalis-Infected Bacterial Vaginosis in Mice, Nutrients 2017, 9, 14 pages.
Kapoor, Mahendra P. et al. Clinical evaluation of Emblica Officinalis Gatertn (Amla) in healthy human subjects: Health benefits and safety results from a randomized, double-blind, crossover placebo-controlled study, Contemporary Clinical Trials Communications 17 (2020), 10 pages.
Katsutoshi, Ara, et al. Effect of Spore-bearing Lactic Acid-forming Bacteria (Bacillus coagulans SANK 70258) Administration on the Intestinal Environment, Defecation Frequency, Fecal Characteristics and Dermal Characteristics In Humans and Rats, Microbial Ecology in Health and Disease, 2002, 10 pages.
Lonsdale, Derrick "A Review of the Biochemistry, Metabolism and Clinical Benefits of Thiamin(e) and Its Derivatives," Advance Access Publication Feb. 1, 2006, eCAM 2006;3(1)49-59.
Marreiro, Dilina do Nascimento, et al. "Zinc and Oxidative Stress: Current Mechanisms," Antioxidants 2017, 6, 24; doi:10.3390/antiox6020024.
McRae, Marc P. Treatment of hyperlipoproteinemia with pantethine: A review and analysis of efficacy and tolerability, Nutrition Research 25 (2005) 319-333.
Menne, Evelyn et al. Human Nutrition and Metabolism-Research Communication, Fn-type Chicory Inulin Hydrolysate Has a Prebiotic Effect in Humans, 2000 American Society for Nutritional Sciences.
Mollace, Vincenzo et al., Hypolipemic and hypoglycaemic activity of bergamot polyphenols: From animal models to human studies, 2010, 8 pages.
Parnell, Jill A. et al., Weight loss during oligofructose supplementation is associated with decreased ghrelin and increased peptide YY in overweight and obese adults2, Am J Clin Nutr. Jun. 2009; 89(6): 1751-1759.
Rao, R.K. et al. Protection and Restitution of Gut Barrier by Probiotics: Nutritional and Clinical Implications, Curr Nutr Food Sci. May 1, 2013; 9(2): 99-107.
Riesberg, Lisa A., et al. Beyond Muscles: The Untapped Potential of Creatine, Int Immunopharmacol. Aug. 2016; 37: 31-42.
Ringel, Yehuda et al. Clinical trial: Probiotic Bacteria Lactobacillus acidophilus NCFM and Bifidobacterium lactis Bi-07 Versus Placebo for the Symptoms of Bloating in Patients with Functional Bowel Disorders—a Double-Blind Study, J Clin Gastroenterol. Jul. 2011; 45(6): 518-525.
Rosca, Mariana et al. Mitochondria in the elderly: is acetylcarnitine a rejuvenator? Adv Drug Deliv Rev. Nov. 30, 2009; 61(14): 1332-1342.
Scartezzini, P. et al. Vitamin C content and antioxidant activity of the fruit and of the Ayurvedic preparation of Emblica officinalis Gaertn, Journal of Ethnopharmacology 104 (2006) 113-118.
Schultz, Michael et al. Lactobacillus plantarum 299V in the Treatment and Prevention of Spontaneous Colitis in Interleukin-10-Deficient Mice, Inflammatory Bowel Diseases, 8(2):71-80, 2002 Crohn's & Colitis Foundation of America, Inc.
Segers, Marijke et al. Towards a better understanding of Lactobacillus rhamnosus GG—host interactions, Segers and Lebeer Microbial Cell Factories 2014, 13(Suppl 1):S7, 16 pages.

(56) References Cited

OTHER PUBLICATIONS

Singh, Manjeet et al. Standardized Extracts of Bacopa monniera Protect Against MPPþ - and Paraquat-Induced Toxicity by Modulating Mitochondrial Activities, Proteasomal Functions, and Redox Pathways, Toxicological Sciences 125(1), 219-232 (2012).

Sokol, Harry, et al. Faecalibacterium prausnitzii is an anti-inflammatory commensal bacterium identified by gut microbiota analysis of Crohn disease patients, PNAS Oct. 28, 2008, vol. 105, No. 43, 16731-16736.

Tandon Disha, et al. A prospective randomized, doubleblind, placebo-controlled, doseresponse relationship study to investigate efficacy of fructooligosaccharides (FOS) on human gut microflora, Scientific Reports, (2019) 9:5473.

Toscano, Marco, Effect of Lactobacillus rhamnosus HN001 and Bifidobacterium longum BB536 on the healthy gut microbiota composition at phyla and species level: A preliminary study, World J Gastroenterol Apr. 21, 2017; 23(15):2696-2704.

Vemuri, Ravichandra et al. Lactobacillus acidophilus DDS-1 Modulates Intestinal-Specific Microbiota, Short-Chain Fatty Acid and Immunological Profiles in Aging Mice, Nutrients 2019, 11, 1297; 23 pages.

Vetvicka, Vaclav, et la. Beta Glucan: Supplement or Drug? From Laboratory to Clinical Trials, Molecules 2019, 24, 1251, 17 pages.

Vigsnaes, Louise, et al. In Vitro Fermentation of Sugar Beet Arabino-Oligosaccharides by Fecal Microbiota Obtained from Patients with Ulcerative Colitis To Selectively Stimulate the Growth of *Bifidobacterium* spp. and *Lactobacillus* spp., Applied and Environmental Microbiology, Dec. 2011, p. 8336-8344.

Wang Haichao et al. Betaine Improves Intestinal Functions by Enhancing Digestive Enzymes, Ameliorating Intestinal Morphology, and Enriching Intestinal Microbiota inHigh-salt stressed Rats, Nutrients 2018, 10, 907, 14 pages.

Wang, Yujue et al. "Supplementing punicalagin reduces oxidative stress markers and restores angiogenic balance in a rat model of pregnancy-induced hypertension," Korean J Physiol Pharmacol 2018;22(4):409-417.

Weiss, G. et al. Role of divalent metals in infectious disease susceptibility and outcome, Clinical Microbiology and Infection 24 (2018) 16-23.

\* cited by examiner

FIG. 3

| | | Knowledge Base (KB) | | | | | | | |
|---|---|---|---|---|---|---|---|---|---|
| | | Wellness Categories | | | | | | | |
| | | Functional Activity Conditions | | | | Pathway Conditions | | | |
| | | Functional Activity Condition 1 | Functional Activity Condition 2 | Functional Activity Condition 3 | ... | Functional Activity Condition n | Pathway Activity Condition 1 | Pathway Activity Condition 2 | Pathway Activity Condition 3 | ... | Pathway Activity Condition m |
| Subject 1 | Normal Range | Suboptimal | Normal Range | ... | Normal Range | Suboptimal | Suboptimal | Normal Range | ... | Suboptimal |
| Subject 2 | Suboptimal | Suboptimal | Normal Range | ... | Suboptimal | Suboptimal | Normal Range | Suboptimal | ... | Normal Range |
| Subject 3 | Normal Range | Normal Range | Normal Range | ... | Normal Range | Suboptimal | Normal Range | Normal Range | ... | Suboptimal |
| Subject 4 | Suboptimal | Normal Range | Suboptimal | ... | Suboptimal | Suboptimal | Normal Range | Normal Range | ... | Normal Range |

FIG. 4

| | Knowledge Base (KB) | | | | | | | |
|---|---|---|---|---|---|---|---|---|
| | Wellness Categories | | | | | | | |
| | Functional Activity Conditions | | | | Pathway Conditions | | | |
| | Functional Activity Condition 1 | Functional Activity Condition 2 | Functional Activity Condition 3 | ... | Functional Activity Condition n | Pathway Activity Condition 1 | Pathway Activity Condition 2 | Pathway Activity Condition 3 | ... | Pathway Activity Condition m |
| Ingredient 1 | ... | Recommend | ... | ... | Strong Recommend | ... | Recommend | ... | ... | Strong Recommend |
| Ingredient 2 | Contraindicated | Strong Recommend | Recommend | ... | ... | Strong Recommend | Recommend | Recommend | ... | Recommend |
| Ingredient 3 | Strong Recommend | ... | Recommend | ... | Recommend | ... | ... | ... | ... | ... |
| Ingredient 4 | ... | Recommend | ... | ... | Contraindicated | Recommend | ... | Recommend | ... | Recommend |
| Ingredient 5 | Recommend | Recommend | Recommend | ... | ... | ... | Recommend | Strong Recommend | ... | ... |
| ... | ... | ... | ... | ... | ... | ... | ... | ... | ... | ... |
| Ingredient q | ... | Recommend | ... | ... | ... | Strong Recommend | Contraindicated | Recommend | ... | Recommend |

FIG. 5

Knowledge Base (KB)

| Subject 1 | Wellness Categories | | | | | | | | | Utility Score |
|---|---|---|---|---|---|---|---|---|---|---|
| | Functional Activity Conditions | | | | | Pathway Conditions | | | | |
| | Normal Range | Suboptimal | Normal Range | ... | Normal Range | Suboptimal | Normal Range | Suboptimal | Normal Range | Suboptimal |
| | Functional Activity Condition 1 | Functional Activity Condition 2 | Functional Activity Condition 3 | ... | Functional Activity Condition n | Pathway Activity Condition 1 | Pathway Activity Condition 2 | Pathway Activity Condition 3 | ... | Pathway Activity Condition m | |
| Ingredient 1 | -- | Recommend | -- | ... | Strong Recommend | -- | Recommend | -- | ... | Strong Recommend | 4 |
| Ingredient 2 | Contraindicated | Strong Recommend | Recommend | ... | Recommend | Strong Recommend | Recommend | -- | ... | Recommend | 6 |
| Ingredient 3 | Strong Recommend | -- | -- | ... | Contraindicated | -- | -- | Recommend | ... | -- | 0 |
| Ingredient 4 | -- | Recommend | Recommend | ... | -- | Recommend | -- | Recommend | ... | Recommend | 3 |
| Ingredient 5 | Recommend | -- | -- | ... | -- | Strong Recommend | Recommend | Strong Recommend | ... | -- | 2 |
| ... | ... | ... | ... | ... | ... | ... | ... | ... | ... | ... | ... |
| Ingredient q | -- | Recommend | -- | ... | -- | Recommend | Contraindicated | Recommend | ... | Recommend | Eliminate |

FIG. 6

| Ingredient Utility Score Rank Order | | Daily Dose (mg) | Ingredient Density in Bin gm/ml | Bin volume for Daily Dose (ml) ("target amount") | Sum Volume | Target Volume = 3.00 ml |
|---|---|---|---|---|---|---|
| Ingredient 2 | 6 | 500 | 1000 | 0.50 | 0.50 | 0.50 |
| Ingredient 1 | 4 | 1000 | 750 | 1.33 | 1.83 | 1.83 |
| Ingredient 4 | 3 | 250 | 1500 | 0.17 | 2.00 | 2.00 |
| Ingredient 5 | 2 | 750 | 500 | 1.50 | 3.50 | 1.00 |
| Ingredient 3 | 0 | 2000 | 400 | 5.00 | X | X |
| Ingredient q | exclude | 500 | 2000 | 0.25 | X | X |

FIG. 9

| Subject 1 | | Wellness Categories | | | | | | | | |
|---|---|---|---|---|---|---|---|---|---|---|
| | | Suboptimal Condition 1 | | ... | Suboptimal Condition 2 | | ... | Suboptimal Condition 3 | | Adjusted Ingredient Utility Score | Bin Utility Score |
| | | Benefit Measure | Dosage Confidence | | Benefit Measure | Dosage Confidence | | Benefit Measure | Dosage Confidence | | |
| Bin 1 | Ingredient 1 | Recommend | | ... | | | ... | Strong Recommend | | 3 | 7 |
| | Ingredient 2 | Strong Recommend | Adjust Down to Recommend | ... | Strong Recommend | | ... | Recommend | | 4 | |
| | Ingredient 3 | -- | | ... | -- | | ... | -- | | 0 | |
| Bin 2 | Ingredient 4 | Recommend | | ... | Recommend | | ... | Recommend | | 3 | 5 |
| | Ingredient 5 | Recommend | | ... | Strong Recommend | Adjust Down to Recommend | ... | -- | | 1 | |
| | Ingredient 6 | -- | | ... | -- | | ... | -- | | 1 | |
| Bin q | Ingredient q | Recommend | | ... | Strong Recommend | | ... | Contraindicated | | Eliminate | 0 |

Knowledge Base

PERSONALIZED NUTRITIONAL SUPPLEMENTS AND METHODS OF MAKING

STATEMENT AS TO FEDERALLY SPONSORED RESEARCH

None.

REFERENCE TO RELATED APPLICATIONS

This application is a Continuation application of International Application Number PCT/US21/65823, filed Dec. 31, 2021, which claims the benefit of the priority date of U.S. provisional application 63/132,986, filed Dec. 31, 2020, the contents of which are incorporated herein in their entirety.

THE NAMES OF THE PARTIES TO A JOINT RESEARCH AGREEMENT

None.

SEQUENCE LISTING

None.

BACKGROUND

Nutrient imbalance in the diet can lead to suboptimal health and wellness. Taking nutritional supplements can mitigate these imbalances and improve health and wellness. Supplements traditionally are either sold individually or in "one-size-fits-all" combinations (such as the multivitamin). This approach has problems. For one thing, an individual may not know which nutritional supplement will contribute most to her or his personal health and wellness. Second, each individual is likely to need a different combination of supplements, so a standard package will not suit every individual equally. There is a need for a nutritional supplement package that is customized to the needs of the individual.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein:

FIG. 3 shows a database in which activity scores, classified as within a "normal range" or "suboptimal" are provided for each of a number of different subjects.

FIG. 4 shows a database in which benefit measures for each of a number of ingredients are provided for each of a number of different wellness categories.

FIG. 5 shows a database in which benefit measures for each of a number of ingredients are provided for each of a number of different wellness categories classified as "suboptimal" for a "Subject 1". Also provided is in utility score indicating a measure of overall benefit for each ingredient.

FIG. 6 shows a rank ordering of overall utility scores for ingredients for Subject 1. Also included are the daily recommended dose, the ingredient density of the ingredient in the been in terms of grams per milliliter, a calculated bin amount for the daily recommended dose, a sum total amount of the cumulative sums of the amounts for each ingredient in rank order and the amount of an ingredient added to reach a target amount.

FIG. 9 shows a database in which bins of ingredients are provided a utility score based on benefit measures of contained ingredients for suboptimal wellness categories.

SUMMARY

Figure 1:
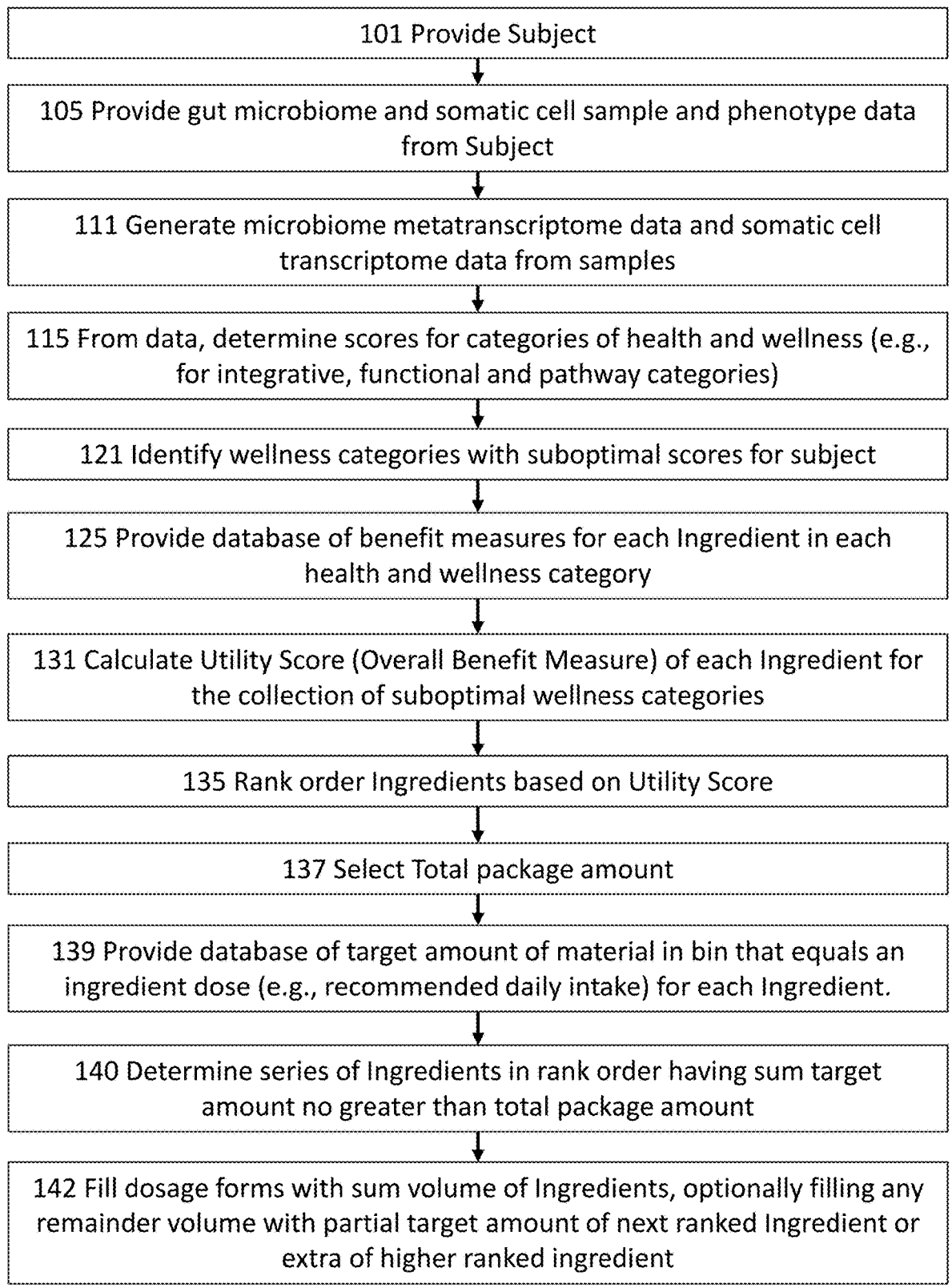
FIG. 1 shows a flow chart of an exemplary method of providing a personalized supplement package for a subject.
Figure 2:
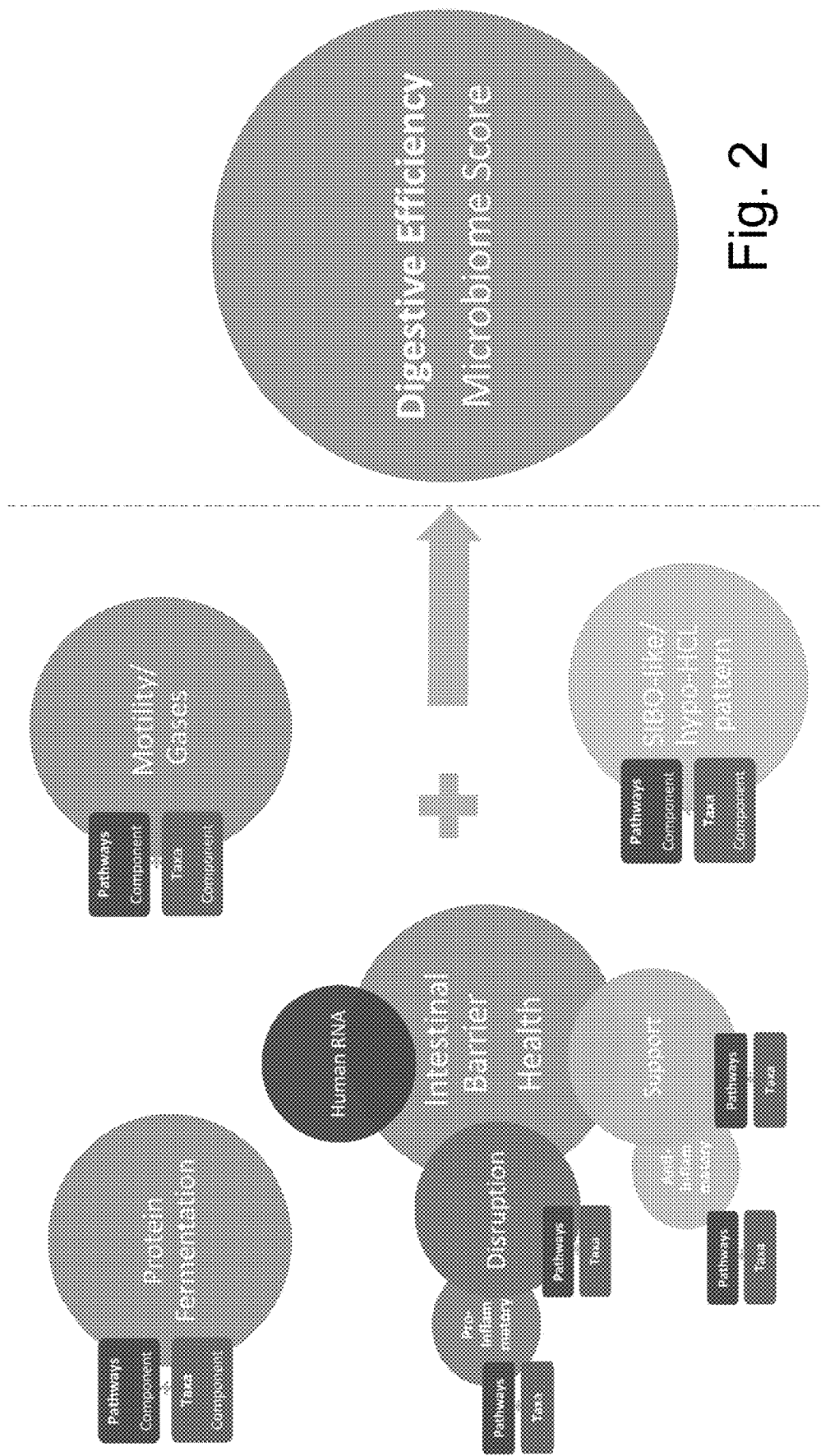
FIG. 2 shows a hierarchical determination of a score for an integrative functional category (digestive efficiency) comprised of other functional activity scores which, in turn, are functions of pathway components and microbial taxa components.

In one aspect, provided herein is a method comprising rank ordering a plurality of ingredients according to their overall benefit for a plurality of health or wellness conditions, and filling a package of predetermined size that comprises one or more dosage forms with ingredient doses of the ingredients in rank order until the package size is filled, e.g., until the ingredient amount in the next ingredient in the rank order is greater than or equal to the remaining space in the package. The method can be performed for a plurality of different sets of health or wellness conditions, each different set personalized to a different subject.

In one aspect, provided herein is a method comprising: a) a providing a database comprising, for each of a plurality of ingredients, a benefit measure for each of a plurality of wellness categories; b) providing a list of wellness categories characterized as suboptimal in a subject; c) determining, for each ingredient, a utility score, wherein the utility score is a function of the benefit measures for the wellness categories; d) providing a plurality of bins, each bin containing a different ingredient or combination of ingredients; e) determining, for each of a plurality of the ingredients, a target amount of material in a bin containing the ingredient; f) identifying one or more ingredient sets, each ingredient set comprising a plurality of ingredients, wherein the sum of the target amounts of the ingredients in the set is no greater than a total package amount, and wherein the ingredients in the set are selected from the list of ingredients in rank order beginning with the ingredient having the highest utility score; and g) filling one or more dosage forms with target amounts of the ingredients from the bins to produce a precision supplements package. In one embodiment operations a) through f) are performed by a programmable digital computer. In another embodiment the plurality of ingredients is at least 50, at least 100 or at least 200 ingredients. In another embodiment the ingredients are classified into categories selected from prebiotics, vitamins, minerals, amino acids, enzymes, coenzymes lipids, botanicals, food extracts, seed and root extracts herbs, herbal extracts, and probiotics. In another embodiment the ingredients set comprises ingredients from a plurality of different categories. In another embodiment wellness categories are selected from phenotypic categories, health functions, functional categories, biochemical pathways or a combination of these. In another embodiment the benefit measure is a tiered measure, optionally including a "no benefit" measure or a "contraindicated" measure. In another embodiment the utility score is designated as "contraindicated" if the ingredient is contraindicated for any suboptimal wellness category. In another embodiment each bin contains only one ingredient. In another embodiment each bin contains a plurality of different ingredients. In another embodiment the target amount contains an ingredient dosage, e.g., a reference daily intake. In another embodiment the reference daily intake is determined by the U.S. Food and Drug Administration. In another embodiment the set of ingredients is selected such that the addition of a target amount from the next ingredient in the rank ordered list of ingredients would put the sum of the target amounts greater than the total package amount. In another embodiment the sum of target amounts is less than the total package amount, and the amount difference is filled with material from a selected bin, provided that the resulting amount contains no more than 125% of the RDI for any ingredient. In another embodiment the one or more dosage forms is a plurality of dosage forms. In another embodiment the dosage forms comprise one or more of a capsule, a tablet, a gummy, a stick pack (e.g., pixie stick), a blister pack and a packet. In another embodiment the method comprises producing a plurality of precision supplement packages.

In another aspect provided herein is a dosage form comprising one or more containers, wherein the dosage form comprises a precision supplement package prepared according to a method as disclosed herein. In one embodiment the dosage form comprises between 5 and 15 separate containers. In another embodiment the containers comprise capsules and/or packets.

In another aspect provided herein is a system comprising: (a) a computer comprising: (i) a processor; and (II) a memory, coupled to the processor, the memory storing a module comprising: (1) a database comprising, for each of a plurality of ingredients, a benefit measure for each of a plurality of wellness categories; (2) data from a subject including one or a plurality of wellness categories for which the subject has a suboptimal score; (3) an algorithm which, when executed, calculates for each ingredient, a utility score, wherein the utility score is a function of the benefit measures for wellness categories in the list of suboptimal wellness categories; (4) an ingredient a database indicating, for each of a plurality of bins containing an ingredient, an amount of material in the bin that constitutes a target dose of the ingredient; (6) an algorithm which, when executed, determines one or more ingredient sets, each ingredient set comprising a plurality of ingredients, wherein the sum of the target amounts of the ingredients in the set is no greater than a total package amount, and wherein the ingredients in the set are selected from the list of ingredients in rank order beginning with the ingredient having the highest utility score; and (7) computer executable instructions for implementing the algorithms. In one embodiment any amount difference between the sum amount and the target amount is either: (i) not filled; (ii) filled with the next rank ordered ingredient; or (iii) filled with one or more previously used ingredient. In another embodiment the system further comprises, in memory: (A) a transcriptome database comprising transcriptome data from somatic cells of the subject and microbiome metatranscriptome data from a microbiome of the subject; (B) an algorithm that calculates, from data in the transcriptome database, activity scores for a plurality of wellness categories, including pathways and integrative functions; and (C) an algorithm that identifies wellness categories that are suboptimal in the subject.

In another aspect provided herein is a robot comprising: (a) a computer system as provided herein; (b) a plurality of bins, each bin containing a different ingredient or combination of ingredients than every other bin; (c) a plurality of containers configured as dosage forms; and (d) a motorized movable arm or conveyer under control of the computer system configured to scoop amounts of material from the binds and deposit them into the dosage forms; wherein the computer system is further programmed to deposit amounts of material into the dosage forms corresponding to the target dose of each ingredient in the set.

In another aspect provided herein is a method comprising identifying a plurality of ingredients, wherein each ingredient provides a benefit to a subject in one or a plurality of wellness categories for which the subject is suboptimal; ranking the ingredients from greatest to least utility score for the plurality of wellness categories; and preparing for the subject a precision supplements package having a total package amount, wherein the precision supplements package comprises a plurality of ingredients selected in series from the highest ranks. In another embodiment wherein the precision supplements package comprises at least the top 1, 2, 3, 4, 5, 6, 7, or 8 highest ranked ingredients. In another embodiment a plurality of the top ranked ingredients are provided in reference daily intake amounts.

In another aspect presented herein is a method comprising administering to a precision supplement package, wherein the precision supplement package includes a plurality of ingredients, wherein the ingredients benefit a plurality of suboptimal wellness category in the subject. In one embodiment the ingredients comprise a series of top-ranked ingredients from a list of ingredients rank-ordered for overall benefit to the plurality of suboptimal wellness conditions.

In another embodiment provided herein is a method comprising: a) identifying one or a plurality of wellness categories for which a subject is suboptimal; b) identifying a plurality of ingredients, wherein each ingredient provides a benefit to the subject in one or a plurality of the suboptimal wellness categories; c) ranking the ingredients from greatest to least utility score for the plurality of wellness categories; and d) preparing for the subject a precision supplements package having a total package amount, wherein the precision supplements package comprises a plurality of ingredients selected from the highest ranks.

DETAILED DESCRIPTION

I. Introduction

Provided herein are personalized nutritional supplements, dosage forms containing them, methods of making the dosage forms, and methods of using them.

In preparing personalized nutritional supplements for a subject, measures of each of a plurality of wellness categories for the subject are determined. Indicators with measures determined to be suboptimal for the subject are identified. Containers that contain unique ingredients or unique sets of ingredients are provided. An ingredient can be any material that provides benefit to a subject with respect to a suboptimal wellness category. Ingredients that support suboptimal health or wellness indicators are selected for inclusion in the bins. The ingredients or bins are rank ordered from most beneficial to least beneficial in supporting or improving collected wellness categories identified as suboptimal in the subject. A dose amount for a selected time period or interval (e.g., a daily dose or a weekly dose) also is determined. An amount of bin material that contains the target dose for each ingredient also can be determined. (This amount is referred to as the "target amount".) The target amount typically will be a function of the target dose of an ingredient and the density of material in a bin containing the ingredient. A total package amount is selected for the total supplement package. Target amounts of ingredients are added to the package until the total package amount is reached. Ingredients included in the total supplement package typically will include ingredients selected from the series of ingredients ranked highest for benefit for the collective suboptimal wellness categories. This could be, for example, at least any of the top 1, 2, 3, 4, 5, 6, 7, 8, 9 or 10 highest ranked ingredients. (For example, this be the top three or the top 5 of the top 8, etc.) Typically, a total of at least 30 different ingredients will be included.

In one embodiment, for each ingredient or bin, in rank order from most to least beneficial for the collected wellness categories with suboptimal scores, the sum of the target amounts for each ingredient or bin is calculated, typically in iterative fashion ("amount sum"). For example, the target amount sums could be the amount of Ingredient 1+Ingredient 2+Ingredient 3, etc. The largest set of ingredients whose sum amount does not exceed the target amount is identified to be included in an ingredient set. A target amount of each ingredient or bin material in the ingredient set is added to a dosage form. Where the sum of the target amounts is less than the total package amount, the unfilled amount can be treated in a number of ways. The amount can remain unfilled. If the unfilled amount is greater than the interval amount for the next ingredient in the ranked list, the unfilled amount can be filled with this ingredient. If all ingredients in the ranked list having positive value have been filled, ingredients already added can be overfilled. Typically this will begin with the highest ranked ingredient. A limit may be placed on the additional amount of an ingredient added, for example, a set percentage above the reference daily intake for the ingredient. The total amount of ingredients then can be packaged in one or a plurality of dosage forms, for example, a plurality of capsules or packets.

Various variables are measured in the practice of the methods described herein. A measurement of a variable, such as a health or wellness indicator, or benefit to a health or wellness indicator, can be any combination of numbers and words. A measure can be any scale, including nominal (e.g., name or category), ordinal (e.g., hierarchical order of categories), interval (distance between members of an order), ratio (interval compared to a meaningful "0"), or a cardinal number measurement that counts the number of things in a set. Measurements of a variable on a nominal scale indicate a name or category, e.g., category into which the sequencing read is classified. Measurements of a variable on an ordinal scale produce a ranking, such as "first", "second", "third". Measurements on a ratio scale include, for example, any measure on a pre-defined scale, absolute number of reads, normalized or estimated numbers, as well as statistical measurements such as frequency, mean, median, standard deviation, or quantile. Measurements that involve quantification are typically determined at the ratio scale level.

II. Data Collection for Wellness Categories

Various data sources can be used to make inferences of the status of one or more wellness categories. Data can come from physical examination of a subject, responses to questionnaires about physical and mental health of a subject, and biochemical data collected from the subject. Data can be self-reported by the subject.

For example, data can be collected that pertain to any of the biological conditions in Table 1, below.

Accordingly, a subject can be determined, by any available method, to have one or more of these conditions. To have such a condition is another way of saying that the subject is suboptimal for the underlying wellness category. Thus, "obesity" may be a suboptimal measure of the category of body weight. "Anxiety" may be a suboptimal measure of the category of emotional health. "Inflammatory bowel disease" may be a suboptimal measure of the category of gut health.

In some embodiments, wellness categories are measured as a function of biochemical data measured from one or a plurality of biological samples taken from a subject. In particular, the biochemical data can include subject (e.g., human) transcriptome and/or microbiome metatranscriptome (e.g., gut microbiome) data.

III. Biological Sample Collection and Processing

A. Biological Samples

As used herein, the term "microbiome" includes a microbial community comprising one or a plurality of different microbial taxa inhabiting a host. As used herein, the term "gut microbiome" refers to a microbiome inhabiting a gut (e.g., stomach, intestines, colon) of a host As used herein, the term "oral microbiome" refers to a microbiome inhabiting a mouth (e.g., tongue, gums, cheek, saliva) or throat, of a host.

The term "host" refers to an animal organism serving a vehicle for habitation of a microbiome. Animal hosts can include vertebrates or invertebrates, including fish, amphibians, reptiles, birds and mammals. Mammalian hosts can include primates and, in particular, humans. Mammalian hosts also can include farm animals and companion animals. A subject can be a host, and vice versa.

As used herein, the term "transcriptome" refers to the collection of RNA transcripts in a sample. The term "metatranscriptome" (MT) refers to the collection of transcriptomes from a plurality of different cell types, for, microbial cells from different taxa. Accordingly, a gut metatranscriptome includes the transcriptomes of the microbiome of, for example, a stool sample.

As used herein, the term "biological sample" refers to a sample that includes material of biological origin, such as cells, biological macromolecules (e.g., nucleic acids, proteins, carbohydrates or lipids) or their derivatives.

Data used in developing a model to make the inferences described herein typically comprise large data sets including thousands, tens of thousands, hundreds of thousands or millions of individual measurements taken from or about a subject, typically at the systems biology level. The data can be derived from one or more (typically a plurality) different biological system components. These biological system components, also referred to herein as "feature groups", include, without limitation, the genome (genomic), the epigenome (epigenomic), the transcriptome (transcriptomic), the proteome (proteomic), the metabolome (metabolomic), the organismal cellular lipid components (lipidome), organismal sugar components of complex carbohydrates (glycomic), the proteome and/or genome of the immune system (immunomics) component of a system, organism phenotype (phenome, phenomic, phenotypic) and environmental exposure (exposome). (These are generally referred to herein as "-omic" data or information.)

A biological sample can be preserved for transport to a laboratory. The sample can be deposited into a container that comprises an aqueous liquid, e.g., a buffered solution. The aqueous liquid can further contain reagents to inhibit or slow degradation of one or more kinds of nucleic acid, such as DNA or RNA. As used herein, the term "nucleic acid preservative" refers to a compound or composition that inhibits degradation of nucleic acid. RNA preservatives include, without limitation, formalin, sulfate (e.g., ammonium sulfate), isothiocyanate (e.g., guanidinium isothiocyanate) and urea. Commercially available RNA preservatives include, for example, TRIzol (ThermoFisher), RNAlater (Ambion, Austin, TX, USA), Allprotect tissue reagent (Qiagen), PAXgene Blood RNA System (PreAnalytiX GmbH, Hombrechtikon), RNA/DNA Shield® (Zymo Research, Irvine, CA), and DNAstable (MilliporeSigma, Burlington, MA).

B. Sample Processing

Sample processing can proceed with cell lysis. Cell lysis can be performed by any method known in the art this can include, for example, bead beading, a method that involves rapidly shaking a container containing solid particles such that cells in the container are lysed.

Polynucleotides can be extracted directly from the sample, or cells in the sample can first be lysed to release their polynucleotides. In one method, lysing cells comprises bead beating (e.g., with zirconium beads). In another method, ultrasonic lysis is used. Such a step may not be necessary for isolating cell-free nucleic acids.

After cell lysis, samples are further processed by the extraction or isolation of biomolecules in the container, e.g., biomolecules released from lysed cells. Isolated biomolecules typically include nucleic acids such as DNA and/or RNA. Other biomolecules to be isolated can include polypeptides, such as proteins.

Isolation of biomolecules can be performed with a liquid-handling robot. After cell lysis, biological molecules, such as nucleic acids can be isolated or extracted from the sample. Nucleic acids can be isolated from the sample by any means known in the art. Polynucleotides can be isolated from a sample by contacting the sample with a solid support comprising moieties that bind nucleic acids, e.g., a silica surface. For example, the solid support can be a column comprising silica or can comprise paramagnetic carboxylate coated beads or a silica membrane. After capturing nucleic acids in a sample, the beads can be immobilized with a magnet and impurities removed. In another method, nucleic acids can be isolated using cellulose, polyethylene glycol, or phenol/chloroform.

If the target polynucleotide is RNA, the sample can be exposed to an agent that degrades DNA, for example, a DNase. Commercially available DNase preparations include, for example, DNase I (Sigma-Aldrich), Turbo DNA-free (ThermoFisher) or RNase-Free DNase (Qiagen). Also, a Qiagen RNeasy kit can be used to purify RNA.

In another embodiment, a sample comprising DNA and RNA can be exposed to a low pH, for example, pH below pH 5, below pH 4 or below pH 3. At such pH, DNA is more subject to degradation than RNA.

DNA can be isolated with silica, cellulose, or other types of surfaces, e.g., Ampure SPRI beads. Kits for such procedures are commercially available from, e.g., Promega (Madison, WI) or Qiagen (Venlo, Netherlands).

Isolation of nucleic acids can further include elimination of non-informative RNA species from the sample. As used herein, the term "non-informative RNA" refers to a form of non-target or non-analyte species of RNA. Non-informative RNA species can include one or more of: human ribosomal RNA (rRNA), human transfer RNA (tRNA), microbial rRNA, and microbial tRNA. Non-informative RNA species can further comprise one or more of the most abundant mRNA species in a sample, for example, hemoglobin and myoglobin in a blood sample. Non-informative RNAs can be removed by contacting the sample with polynucleotide probes that hybridize with the non-informative species and that are attached to solid particles which can be removed from the sample. Examples of sequences that can be removed include microbial ribosomal RNA, including 16S rRNA, 5S rRNA, and 23S rRNA. Other examples of sequences that can be removed include host RNA. Examples include host rRNA, such as 18S rRNA, 5S rRNA, and 28S rRNA.

Isolated nucleic acids can be further processed to produce nucleic acid libraries. Production of nucleic acid libraries typically includes, in the case of RNA, converting RNA into DNA, e.g., by reverse transcription. Adaptors adapted for the DNA sequencing instrument to be used are typically attached to the DNA molecules.

According to one method, RNA molecules are reverse transcribed into cDNA using a reverse transcriptase. In certain embodiments, primers comprising a degenerate hexamer at their 3' end hybridize to RNA molecules. The reverse transcriptase extends the primer and can leave a terminal poly-G overhang. In certain embodiments, the primer can also comprise adapter sequences. A template molecule comprising a Poly-C overhang and, optionally, adapter sequences, can be hybridized to the poly-G overhang and used to guide extension to produce an adapter tagged cDNA molecule comprising a cDNA insert flanked by adapter sequences.

If the target polynucleotide is DNA, then DNA can be isolated with silica, cellulose, or other types of surfaces, e.g., Ampure SPRI beads. Kits for such procedures are commercially available from, e.g., Promega (Madison, WI) or Qiagen (Venlo, Netherlands).

Methods of enriching nucleic acid samples include the use of oligonucleotide probes. Such probes can be used for either positive selection or negative selection. Such methods often reduce the amount of non-target nucleotides.

Adapter tagged cDNA molecules can be amplified using well-known techniques such as PCR, to produce a library.

In certain embodiments the nucleic acids to be sequenced are comprised in the transcriptome. As used herein, the term "metatranscriptome" refers to the set of RNA molecules in a population of cells. This can include all RNAs, but sometimes refers to only mRNA. In the present context it generally refers to RNA molecules produced by either human or microbial cells. In certain embodiments, the nucleic acids to be sequenced can be free or essentially free of host nucleic acids ("host-free nucleic acids").

C. Nucleic Acid Sequencing

The isolated nucleic acids are generally sequenced for subsequent analysis. The methods described herein generally employ high throughput sequencing methods. As used herein, the term "high throughput sequencing" refers to the simultaneous or near simultaneous sequencing of thousands of nucleic acid molecules. High throughput sequencing is sometimes referred to as "next generation sequencing" or "massively parallel sequencing." Platforms for high throughput sequencing include, without limitation, massively parallel signature sequencing (MPSS), Polony sequencing, 454 pyrosequencing, Illumine (Solexa) sequencing, SOLiD sequencing, Ion Torrent semiconductor sequencing, DNA nanoball sequencing (Complete Genomics), Heliscope single molecule sequencing, single molecule real time (SMRT) sequencing (PacBio), and nanopore DNA sequencing (e.g., Oxford Nanopore). Nucleotide sequences of nucleic acids produced by sequencing are referred to herein as "sequence information" or "sequence data".

D. Bioinformatics

The sequences obtained from these methods can be preprocessed prior to analysis. If the methods include sequencing a transcriptome, the transcriptome can be preprocessed prior to analysis. In one method, sequence reads for which there is paired end sequence data are selected. Alternatively, or in addition, sequence reads that align to a reference genome of the host are removed from the collection. This produces a set of host-free transcriptome sequences. Alternatively, or in addition, sequence reads that encode non-target nucleotides can be removed prior to analysis. As described above, non-target nucleotides include those that are over-represented in a sample or non-informative of taxonomic information. Removing sequence reads that encode such non-target nucleotides can improve performance of the systems, methods, and databases described herein by limiting the sequence signature database to open reading frames (a part of a reading frame that has the ability to be translated) can the size of the database, the amount of memory required to run the sequence signature generation analysis, the number of CPU cycles required to run the sequence signature generation analysis, the amount of storage required to store the database, the amount of time needed to compare sample sequences to the database, the number of alignments that must be performed to identify sequence signatures in a sample, the amount of memory required to run the sequence signature sample analysis, the number of CPU cycles required to run the sequence signature sample analysis, etc.

1. Taxonomic Data

Subject data can include taxonomic data about the taxonomic classification and amounts of microbes in a microbiome of the subject. Such data is typically derived from nucleic acid sequence data obtained from the subject's microbiome. 16S RNA sequences are a standard source of information for assigning taxonomic classifications. Non-rRNA transcriptome data as an alternative source of information for taxonomic classification. Such methods are described in international patent publication WO 2018/160899 ("Systems And Methods For Metagenomic Analysis"). Many metagenomic classifiers, aligners and profilers are publicly available. See, for example, Florian P Breitwieser et al., "A review of methods and databases for metagenomic classification and assembly," Briefings in Bioinformatics, Volume 20, Issue 4, July 2019, Pages 1125-1136, doi.org/10.1093/bib/bbx120, Published: 23 Sep. 2017. These include, without limitation, Centrifuge, GOTTCHA, kraken, kraken2, CLARK, Kaiju, MetaPhlAn, MetaPhlAn2, MEGAN, LMAT, MetaFlow, mOTUs, and mOTUs2.

Another method of analysis includes analysis of composition of microbiomes ("ANCOM"). This method is described in, for example, Mandel S, et al., "Analysis of composition of microbiomes: a novel method for studying microbial composition", Microb Ecol Health Dis. 2015 May 29; 26:27663. doi: 10.3402/mehd.v26.27663. eCollection 2015.

Taxonomic analysis can involve searching a sequence catalog of microbiome sequences for matches with sequences in the dataset, e.g., meta-transcriptomic sequences. Matches are assigned to the proper taxonomic category. Numbers of matches with a taxonomic category can indicate quantities of microbes of that taxonomic category in the sample.

The classifications can be at one or a plurality of different taxonomic levels, typically down to the species or strain level. Sequencing reads that map to sequences in the sub-catalog can then be labeled with tags indicating the taxonomic category at each level. The taxonomic label is assigned. Such systems can include classical or modern taxonomic classification systems.

As used herein, the term "taxon" (plural "taxa") is a group of one or more populations of an organism or organisms seen by taxonomists to form a unit. A taxon is usually known by a particular name and given a particular ranking. For example, species are often designated using binomial nomenclature comprising a combination of a generic name for the genus and a specific name for the species. Likewise, subspecies are often designated using trinomial nomenclature comprising a generic name, a specific name, and a subspecific name. The taxonomic name for an organism at the taxonomic rank of genus is the generic name, the taxonomic name for an organism at the taxonomic rank of species is the specific name, and the taxonomic name for an organism at the taxonomic rank of subspecies is the subspecific name, when appropriate.

As used herein, the term "taxonomic level" refers to a level in a taxonomic hierarchy of organisms such as, strain, species, genus, family, order, class, phylum, and kingdom. In some embodiments, each taxonomic level includes a plurality of "taxonomic categories", that is, the different categories belonging to particular taxonomic level. Some taxonomic levels only include a single member.

As used herein, the term "species" is intended to encompass both morphological and molecular methods of categorization. Species can be defined by genetic similarity. In some embodiments, a cladistic species is an evolutionarily divergent lineage and is the smallest group of populations that can be distinguished by a unique set of morphological or genetic traits.

Genomes imported into the reference catalog are typically indexed with a genome number. Various taxonomy indices, such as the NCBI taxonomy, categorized each genome number into a taxonomic classification. Consequently, sequencing reads that match reference sequences can also be taxonomically classified based on the number. Accordingly, using a taxonomic tree implicit in the taxonomic designation taxonomic source of any sequencing read can be identified and classified.

Once classified, sequences in each category can be quantified or estimated to determine amounts of sequencing reads in each taxonomic category and the relative abundance of each taxonomic entity. The sequencing reads can be meta-transcriptomic in origin. Accordingly, amounts of reads in a taxon represent transcriptional activity of the taxon, rather than pure numbers of organisms in the taxon in the sample.

2. Gene Expression Quantitation

The methods, systems and databases herein can be used to identify activity of a gene, a biochemical pathway or a functional activity from host cells or microbes that are present in the sample. In some embodiments, the methods include aligning sequencing reads to a database comprising open reading frame information that is associated with a particular biochemical activity or pathway. Some of such methods can include identifying taxonomic information for a sequence. Examples include the VIOMEGA algorithm (see WO 2018/160899 (Vuyisich et al.) or GOTTCHA algorithm, which detects sequence signatures that identify nucleic acids as originating from organisms at various taxonomic levels. Nucleic Acids Res. 2015 May 26; 43(10): e69. Other methods include MetaPhlAn, Bowtie2, mOTUs, Kraken, and BLAST. Some of such methods do not include identifying taxonomic information for the sequence, but instead may identify the biochemical activity, pathway, protein, functional RNA, product, or metabolite associated with a particular sequence read or sequence signature.

"Gene expression," "gene activity" or "activity of a gene" is generally a function of transcription, e.g., the quantity of RNA in a sample encoding the gene. This can be done at any taxonomic level. For example, gene activity could be a measure of activity of the gene in a single species, or it could be activity of the gene across organisms belonging to a common genus, class, order or phylum. Thus, the term "gene" can refer to orthologs of a gene across different species. As used herein, the term "gene ortholog" refers to a homologous version of a gene across different taxa having the same biological function. Typically, gene orthologs share a high degree of sequence identity. Such orthologs can be identified, for example, with the KEGG orthology. Kanehisa, M. and Goto, S.; KEGG: Kyoto Encyclopedia of Genes and Genomes. Nucleic Acids Res. 28, 27-30 (2000)). KO (KEGG Orthology) databases. The KO (KEGG Orthology) database is a database of molecular functions represented in terms of functional orthologs. The KO databases include, among other things, genomic information, chemical information and systems information such as biological pathway maps. A functional ortholog is manually defined in the context of KEGG molecular networks, namely, KEGG pathway maps, BRITE hierarchies and KEGG modules. In the KEGG orthology, orthologs are identified by number. So, for example, "K01808" refers to rpiB; ribose 5-phosphate isomerase B [EC:5.3.1.6]. Search at the world wide web site genome.jp/kegg/kegg2.html.

Nucleic acid sequence information is processed using bioinformatics to extract higher order information. In particular, two types of information that are usefully extracted from sequence data include gene activity information and taxa activity information.

Similar bioinformatic approaches can be used to analyze human gene expression, by identifying and counting the transcripts produced by human cells. Bioinformatic software to extract such information from sequence data is known in the art. Examples include the VIOMEGA algorithm (see WO 2018/160899 (Vuyisich et al.) or GOTTCHA algorithm, which detects sequence signatures that identify nucleic acids as originating from organisms at various taxonomic levels. Nucleic Acids Res. 2015 May 26; 43(10): e69. Other methods include MetaPhlAn, Bowtie2, mOTUs, Kraken, and BLAST.

IV. Measures of Health and Wellness

A "wellness category" is any measurable category associated with health or wellness. Wellness categories include medical conditions that may require diagnosis by a medical professional. They also include biomarkers associated with conditions. They also include signs or symptoms of conditions. They also include molecular data on components of pathways (e.g., biochemical pathways) or integrated functions (e.g., collections of pathways) associated with various conditions.

Health and wellness can be measured at several different hierarchical levels. Each hierarchical level can integrate scores from categories at lower hierarchical levels. In one embodiment the hierarchical levels can include integrative health categories, functional activity categories, pathway categories, gene expression and microbial taxa categories. A measure can be determined for categories at each hierarchical level. These measures, in turn, can be classified as "within normal range" or "suboptimal". For example, for each wellness category, an activity score can be calculated. Activity scores determined to be outside a reference range can be classified as "suboptimal". The reference range can be, for example, a statistical measure such as more than a standard deviation from the mean. It also can be the presence of pathology or other unhealthy state. Ingredients can be identified which benefit or support health of indices identified as suboptimal for a subject.

A. Wellness Categories

1. Phenotypic Wellness Categories

Phenotypic wellness categories include categories determined at the physiological or organismal level. These include, without limitation, the conditions identified in Table 1.

TABLE 1

Exemplary Wellness Categories

| | |
|---|---|
| Abdominal Weight | Gastroesophageal reflux disease (GERD) |
| Acne | GI Inflammation |
| Attention Deficit Disorder | Headache Condition |
| Allergy | HypoGlycemia |
| Allergy ENT Condition | HypoThyroid Condition |
| Allergy Lung Condition | Infection Condition |
| Allergy Skin Condition | Insomnia |
| Anxiety | Leaky Gut Condition |
| AutoImmune | Liver Condition |
| Autoimmune Gut Condition | Lung Condition |
| Autoimmune Joint Condition | Male Hormone Condition |
| Autoimmune Skin Condition | Muscle Condition |
| Cardiovascular Condition | Nerve Condition |
| Depression | Nutritional Deficiency |
| Diverticular Condition | Obesity |
| Dysbiosis | Overweight |
| DysGlycemia (hyperglycemia) | Small Intestinal Bacterial Overgrowth |
| Dysmotility | Thyroid Condition |
| ENT Condition | Female Hormone Condition |
| Eye Condition | Food Reaction |
| glaucoma | macular degeneration |
| hearing loss | stroke |
| depression | Alzheimer's |
| multiple sclerosis | Parkinson's disease |
| high blood pressure | cardiomyopathy |
| chronic obstructive pulmonary disease | type I diabetes |
| type II diabetes | cancer |
| hepatitis | pancreatitis |
| kidney disease | inflammatory bowel disease |
| Crohn's disease | fatigue |
| acne | |

2. Integrative Health Categories

Integrative Health Categories are categories providing some measure of health or wellness at the overall organismal level. Integrative health categories can include, for example, the categories in Table 2.

TABLE 2

Exemplary Integrative Health Categories

| | |
|---|---|
| cellular health | stress response health |
| mitochondrial health | gut microbiome health |
| immune system health | biological age |

A Gut Microbiome Health score can integrate microbial functional scores.

A Cellular Health score can reflect what is happening in the human body on the cellular level and takes into account the aging of your, cellular stress, cellular inflammation, along with the health of mitochondria.

A Mitochondrial Health score is an integrative score that assesses the efficiency of the functions of mitochondria.

A Stress Response Health score can reflect microbiome-induced stress factors as well as cellular functions that get activated in response to various triggers of cellular stress.

An Immune System Health score can reflect immune response based on the inflammatory activities throughout your body as well as inside of a subject's gut.

A Biological Age reflects the efficiency of cellular activities and gut microbial activities consistent with biological age in comparison with chronological age.

3. Functional Activity Categories

Functional activities are biological activity categories typically at the cell or organ level. Exemplary functional activity categories are provided in Table 3.

Table 3: Exemplary Functional Activity Categories

Active Microbial Diversity
Cardiovascular health
Cellular senescence
Cellular Stress
Detoxification potential
Diabetes
Digestive Efficiency
Energy production pathways
Gas Production
Gastrointestinal health
Gut lining health
Microbiome-induced Stress
Immune function
Immune system activation
Inflammatory Activity
Intestinal barrier health
Infectious disease
Hepatic function
Hormonal balance
Mitochondrial Health
Metabolic fitness
Musculoskeletal health
Mitochondrial activity
Neurological health
Neuro- gut balance
Protein Fermentation
SIBO-like hypochlorhydrea pattern
Protein fermentation
Skin conditions
Urogenital health For example, Inflammatory Activity measures all the activities of the microbes that can contribute to or reflect inflammation in the gut environment. Metabolic Fitness represents active microbial organisms and functions that are associated with the blood sugar, insulin resistance, or weight control. Metabolic fitness compares the activity of both metabolic-healthy and metabolic-unhealthy microbes. Microbial Richness is the percentile for total count of active microbial species detected and sequenced from the sample. Digestive Efficiency uses a culmination of protein fermentation, motility/gases, intestinal barrier health, and SIBO-like/hypo-HCL pattern scores to assess the overall efficiency of the digestion. Intestinal Barrier Health focuses on the gut lining (or intestinal barrier) and the health of the mucosal layer that protects it. Overall Gas Production is an assessment of the overall gas production activity by the microbes in the gut. Protein Fermentation reflects whether or not one is digesting the proteins properly.

4. Pathway Categories

As used herein, the term "pathway" refers to a biological pathway. Biological pathways are sequences of proven molecular events (such as enzymatic reactions or signal transduction or transport of substances or morphological structure changes) that lead to specific functional outcomes (such as secretion of substances, sporulation, biofilm formation, motility). Many biological pathways are known in the art, and examples can be found on the web at wikipathways.org/index.php/WikiPathways, pathwaycommons.org, and proteinlounge.com/Pathway/Pathways.aspx. Manual expert curation of scientific literature also can be used to reconstruct or create custom biological pathways. Biological pathways can include a number of genes that encode peptides or proteins, which play specific signaling, metabolic, structural or other biochemical roles in order to carry out various molecular pathways.

Exemplary pathway categories are provided in Table 4:

TABLE 4

Exemplary Pathway Categories

| | |
|---|---|
| butyrate production pathways | TMA production pathways |
| LPS biosynthesis pathways | primary bile acid pathways |
| methane gas production pathways | secondary bile acid pathways |
| sulfide gas production pathways | acetate pathways |
| flagellar assembly pathways | propionate pathways |
| ammonia production pathways | branched chain amino acid pathways |
| putrescine production pathways | long chain fatty acid metabolism pathways |
| oxalate metabolism pathways | long chain carbohydrate metabolic pathways |
| uric acid production pathways | cadaverine production pathways |
| salt stress pathways | tryptophan pathways |
| biofilm chemotaxis in virulence pathways | starch metabolism pathways |
| Mitochondrial biogenesis pathways | fucose metabolism pathways |
| Energy production pathways | |

For example, Butyrate Production Pathway assesses the levels of activity of all microbial pathways that lead to the production of a beneficial nutrient called butyrate. LPS Biosynthesis Pathway assesses the levels of activity of all microbial pathways leading to the production of LPS (lipopolysaccharides) in the gut. Methane Gas Production Pathway assesses the levels of activity of all microbial pathways that result in giving off methane gas in the gut. Sulfide Gas Production Pathway assesses the levels of activity of all microbial pathways that result in the production of hydrogen sulfide gas. Flagellar Assembly Pathway assesses the levels of activity of all microbial pathways leading to the making of a structure called flagella. Ammonia Production Pathway assesses the levels of activity of all microbial pathways that result in the production of ammonia. Putrescine Production Pathway assesses the levels of activity of all microbial pathways that lead to putrescine production. Oxalate Metabolism Pathway assesses the levels of activity of all microbial pathways needed to break down or metabolize oxalate. Uric Acid Production Pathway assesses the levels of activity of all microbial pathways that lead to the production of uric acid (or urate). Salt Stress Pathway assesses the levels of activity of all microbial pathways that signal excessive salt in the gut environment. Biofilm, Chemotaxis, and Virulence Pathway assesses the levels of all activity of all metabolic pathways that suggest a pro-inflammatory or hostile environment in the gut. Bile Acid Metabolism Pathway assesses the levels of activity of all metabolic pathways that include bile acids. TMA Production Pathway assesses the levels of all activity of metabolic pathways that result in TMA production. TMA (trimethylamine) is a molecule that gets converted to TMAO (Trimethylamine N-oxide) in the liver.

5. Taxa Categories

The activities of one or more taxa groups can be determined from the amount of nucleic acid, e.g., RNA, in a sample originating from particular taxonomic groups. Microbial taxa include taxonomic designation at any taxonomic level, e.g., species, genus, order, class, or phylum. Active microbial taxa are taxa that are not merely present but that are metabolically active, e.g., as measured by transcriptional levels of the microbial genome.

Groups of microbial taxa whose activity contribute to functional activity in a functional category are referred to herein as "taxa groups". So, for example, pro-inflammatory taxa group can comprise one or more of: proteobacteria, opportunistic bacteria or pathogens, viruses; anti-inflammatory taxa group can comprise one or more of: butyrate producers, Lactobacilli and Bifidobacteria; intestinal barrier disruptors taxa comprise one or more of: *Ruminococcos torques, Ruminococcus gnavus, Serratia, Sutterella*, and other mucus-degrading or epithelial layer-disrupting organisms.

Taxa groups of interest include, without limitation, those shown in Table 5.

TABLE 5

Exemplary Taxa Categories

| | |
|---|---|
| *Prevotella* (genus)/*Bacteroides* (genus) ratio | *Lactobacillus* (genus) |
| *Eubacterium rectale* (species) | *Clostridium butyricum* (species) |
| *Eubacterium eligens* (species) | *Allobaculum* (genus) |
| *Faecalibacterium prausnitzii* (species) | Firmicutes (phylum)/Bacteroidetes (phylum) ratio |
| *Akkermansia muciniphila* (species) | Lachnospiraceae (family) |
| metabolic-related probiotic species (functional group) | Enterobacteriaceae (family) |
| *Roseburia* (genus) | *Ralstonia pickettii* (species) |
| *Bifidobacterium* (genus) | *Bilophila wadsworthia* (species |

B. Activity Scores

As used herein, the term "activity score" refers to a measure of activity of a wellness category. Accordingly, an integrative health activity score is a measure of health or wellness of the integrative health category. A functional activity score is a measure of activity of an integrative functional category. A pathway activity score is a measure of activity of a pathway category. A taxa activity score is a measure of activity of a taxon or taxa category. In certain embodiments, an activity score is a function of activity scores of categories at a lower hierarchical level. So, for example, an integrative health activity score can be a function of one or more integrative functional activity scores. A functional activity score can be a function of pathway activity scores and/or taxa activity scores. Pathway activity scores, in turn, can be a function of activity scores of genes involved in the pathway.

Functional categories can be hierarchical in nature, with functional categories at lower levels in the hierarchy being aggregated into functional categories at higher levels in the hierarchy. For example, at a lowest level a single gene, biochemical pathway, microbial taxon or group of microbial taxa can serve as a functional category. Combinations of pathways and microbial taxa groups can be integrated into higher level categories. This includes, for example, a plurality of pathways, a plurality of taxa groups or at least one pathway and at least one taxa group. A number of functional categories can be aggregated into a higher order functional category, in this case, digestive efficiency. More specifically, in this example, digestive efficiency aggregated scores from the categories of protein fermentation, motility/gases, intestinal barrier health and SIBO-like/hypochlorhydrea pattern. While the final aggregated functional category is provided with a functional activity score, each sub functional category which is comprised within the highest functional category may itself be provided with a discrete score or other logic may be used to aggregate functional activities of the subcategories into the topmost functional category.

An activity score can be given as within or outside a reference value, such as a range. The reference value can be derived from values across a population of subjects. For example, the reference range may constitute a statistical range within the population, such as a standard deviation from the mean. Alternatively, the reference range may be determined by expert analysis, by logic and/or with reference to literature sources. The value can be given as a continuous or discrete variable. For example, discrete variables can be given as "low" "medium" or "high", with "medium" constituting the reference range. Both "low" and "high" may be outside the reference range. A score can be "within a reference range" or "outside a reference range" which also can be referred to as "suboptimal" Alternatively, the score can be given as "good", "average" or "needs improvement". A score of "needs improvement" indicates a score outside of a reference range for which action is recommended.

Methods of determining health scores, functional activity scores, and pathway scores are described in, for example, WO 2019/209753A1 (Oct. 31, 2019) (Systems And Methods For Inferring Scores For Health Metrics), WO 2020/051559 (Mar. 12, 2020) (Systems And Methods For Microbiome Analysis), WO 2020/076874 (Apr. 8, 2020) (Methods For And Compositions For Determining Food Item Recommendations); and WO 2020/168015 (Aug. 20, 2020) (Personalizing Food Recommendations To Reduce Glycemic Response), incorporated herein by reference.

V. Ingredients

A. Exemplary Ingredients

"Ingredients" are compositions of matter that can be added to an ultimate dosage package. Ingredients can include, among other things, any form of dietary supplement or nutrient. Ingredients include, without limitation, prebiotics, vitamins, minerals, amino acids, enzymes, coenzymes lipids, botanicals, food extracts, seed and root extracts herbs, herbal extracts, and probiotics. Natural products include, for example, *Ginkgo biloba*, curcumin, cranberry, St. John's wort, ginseng, resveratrol, glucosamine and collagen.

The total number of ingredients selected from can be at least any of 10, 25, 50, 100, 150, 200, 300, 400 or 500. The total number of ingredients can be between 10 and 500 or between 100 and 300, or more than 100. In one embodiment, the number of ingredients is about 200.

A list of exemplary ingredients is provided in Table 6.

TABLE 6

| Ingredient | Category | Conditions Benefited |
|---|---|---|
| *B. animalis* ssp *lactis* BL-04 | Probiotics | Inflammatory Activity, Active Microbial Diversity |
| *B. longum* ssp *infantis* Bi-26 | Probiotics | Inflammatory Activity, Active Microbial Diversity |
| *B. subtilis* DE111 | Probiotics | Digestive Efficiency, Active MicrobialDiversity |
| *L. fermentum* LF61 | Probiotics | Active Microbial Diversity |
| *Bacillus coagulans* SANK 70258 | Probiotics | Microbiome-Induced Stress, Gas Production |
| *L. acidophilus* DDS-1 | Probiotics | Gut Lining Health, Butyrate Production Pathways |
| *L. acidophilus* La-14 | Probiotics | LPS Biosynthesis Pathways, Immune System Activation |
| *L. acidophilus* NCFM | Probiotics | Digestive Efficiency, Gas Production |
| *L. rhamnosus* GG (ATCC53103) | Probiotics | Gut Lining Health, Microbiome-Induced Stress, Digestive Efficiency |
| *L. casei* Lc-11 | Probiotics | Protein Fermentation |
| *L. plantarum* 299v | Probiotics | Immune System Activation, Gut Lining Health |

TABLE 6-continued

| Ingredient | Category | Conditions Benefited |
|---|---|---|
| L. rhamnosus HN001 | Probiotics | Active Microbial Diversity |
| Acacia Fiber | Prebiotics | Active Microbial Diversity, Gut Lining Health |
| Acetyl L-Carnitine | Food Extracts | Mitochondrial Health |
| Amla Fruit Extract | Food Extracts | Cellular Stress, Energy Production Pathways |
| Ashwagandha Root & Leaf Extract | Food Extracts | Mitochondrial Health, Immune System Activation, Cellular Stress |
| Astaxanthin | Food Extracts | Metabolic Fitness, Cellular Stress |
| Bacopa Monnieri Extract | Food Extracts | Cellular Stress, Mitochondrial Biogenesis Pathways |
| Betaine Hydrochloride | Food Extracts | Digestive Efficiency, Salt Stress Pathways scores |
| Beet Root Juice | Food Extracts | Immune System Activation, Gut Lining Health |
| Beta-Glucan | Prebiotics | Immune System Activation, Metabolic Fitness |
| Boswellia Serrata | Food Extracts | Inflammatory Activity, Cellular Stress |
| Coenzyme Q-10 (CoQ10) | Food Extracts | Energy Production Pathways, Mitochondrial Biogenesis Pathways |
| Citrus flavonoids | Food Extracts | Gas Production, Cellular Stress |
| Copper | Minerals | Inflammatory Activity |
| Creatine | Food Extracts | Energy Production Pathways |
| Fisetin | Food Extracts | Immune System Activation, Mitochondrial Biogenesis Pathways, Cellular Senescence Pathways |
| Fructo-oligosaccharides | Prebiotics | Gut Lining Health, Active Microbial Diversity |
| Gamma Oryzanol | Food Extracts | Metabolic Fitness |
| Garlic Extract | Food Extracts | Gas Production |
| Lycopene | Food Extracts | Cellular Stress, Inflammatory Activity |
| Magnesium | Minerals | Energy Production Pathways, Mitochondrial Health |
| Nicotinamide Riboside | Vitamins | Mitochondrial Biogenesis Pathways, Cellular Senescence Pathways |
| Oregano | Food Extracts | Inflammatory Activity, LPS Biosynthesis Pathways |
| Pantethine | Vitamins | Immune System Activation, Metabolic Fitness |
| Pomegranate Extract | Food Extracts | Cellular Stress, Cellular Senescence Pathways |
| Pumpkin Seed | Food Extracts | Oxalate Metabolism Pathways |
| Pyrroloquinoline Quinone | Vitamins | Energy Production Pathways, Mitochondrial Health |
| Saffron Stigma Extract | Food Extracts | Cellular Stress |
| Sage Leaf Extract | Food Extracts | Biofilm Chemotaxis Virulence Pathways |
| Saw Palmetto Berry Extract | Food Extracts | Immune System Activation |
| Selenium | Minerals | Cellular Stress |
| Strawberry Fruit | Food Extracts | Cellular Senescence Pathways, GutLining Health |
| L-Theanine | Amino Acids | Mitochondrial Health |
| Trimethylglycine | Food Extracts | Salt Stress Pathways |
| L-Tryptophan | Amino Acids | Gut Lining Health |
| Vitamin B1 (Thiamine) | Vitamins | Energy Production Pathways, CellularStress, Mitochondrial Health |
| Vitamin B2 (Riboflavin) | Vitamins | Cellular Stress, Inflammatory Activity |
| Vitamin B3 (Niacin) | Vitamins | Energy Production Pathways, Cellular Stress, Immune System Activation |
| Vitamin B6 (P5P) | Vitamins | Energy Production Pathways, Mitochondrial Health |
| Zinc | Minerals | Cellular Stress, Immune System Activation |

A. Benefit Measures

A benefit measure is assigned to each ingredient for each of the wellness categories for which subjects may be tested. A "benefit measure" is a measure of the benefit an ingredient has on a wellness category. The benefit measure is a measure of how well the ingredient is related to benefiting a condition. This includes, for example, diminishing or improving symptoms or signs or, decreasing the severity of, or slowing the progression of a condition associated with a suboptimal score for a wellness category.

Benefit measures can be hierarchically arranged from strongly beneficial, to no effect, to harmful. There can be 2, 3, 4 or 5 different tiers of positive benefit. The measure can be designated as a number, for example, +2 (strongly recommended), +1 (recommended), 0 (no effect) and "X" (contraindicated). Alternatively, the positive measures can include "strongly recommended", "recommended", and "some benefit". No benefit can be indicated as a null. This information can be organized into a database or dataset. For example, each row may indicate a different ingredient. Each column may indicate a health or wellness indicator, and each cell can provide the benefit measure. See, e.g., FIG. 4.

B. Determination of Utility Score

For each ingredient, an ingredient utility score is calculated. An "ingredient utility score" is a measure of overall benefit of an ingredient for the collection of wellness categories measured as "suboptimal" for a subject. The measure of overall benefit is a function of the measures of benefit for each suboptimal wellness category: $S(i)=f(B_{1i}, B_{2i}, B_{3i}, \ldots B_{ni})$, wherein Si is the utility score for ingredient (i), and B is the measure of benefit of ingredient (i) for conditions 1–n. In one embodiment the measure of overall benefit can be the sum of the measures of individual benefits. In other embodiments, the function weights measures based on the wellness category. So, for example, if an ingredient is assigned scores of +2, +1, 0 and 0 for each of four suboptimal wellness categories, an overall utility score of +3 can be provided.

Alternatively, a bin utility score can be calculated. As discussed below, a bin can comprise one or a plurality of ingredients. A target amount of material from a bin can be that amount that includes an ingredient dose of each of one or more of the ingredients in the bin. A bin utility score is a function of ingredient utility scores for each ingredient in the bin, and optionally includes a dosage confidence factor. The dosage confidence factor adjusts an ingredient utility score for expected utility for a condition in view of the target amount of the ingredient in the bin. So, for example, if the target amount of an ingredient is less than the amount expected to provide a full benefit for a condition, the benefit measure, and, therefore, the utility score, for that ingredient can be adjusted down. For example, a target amount may include a recommended daily intake determined, for example, by the U.S. Food and Drug Administration. However, scientific literature may indicate that a higher dose provides more benefit for a particular wellness condition. In that case, the benefit measure of the ingredient for that condition can be adjusted downward to lower the overall bin utility score.

C. Rank Ordering Ingredients by Utility Score

Ingredients or bins can then be rank ordered from highest utility score to lowest utility score. Certain ingredients/bins may have positive overall utility scores, other may have no benefit and others may have negative benefit. It can suffice to rank order only those ingredients/bins with positive utility score. If an ingredient is contraindicated for any suboptimal wellness condition, it can be eliminated from consideration for inclusion in the ultimate supplement package. In case of tie, either tied ingredient or bin can be ranked ahead.

The result is a list of ingredients/bins rank ordered in terms of utility score to a particular subject.

D. Ingredient Dose

The amount of an ingredient to be included in a supplement package is referred to as the "ingredient dose". The ingredient dose also will reflect the time period for which the settlement package is to be consumed. So, for example, if the contents of the supplement package are to be taken daily, the ingredient dose can be, for example, an amount based on a reference daily intake ("RDI"), a recommended daily allowance or an expert-determined dose for the ingredient. For example, the reference daily intake can be an amount recommended by a government authority, such as the Food and Drug Administration, or recommended by a non-government authority or a healthcare provider such as a doctor or nurse. Supplement packages can be configured to be consumed for example, daily, once every other day, or weekly.

VI. Bins

In preparing customized supplement packages, ingredients can be collected, e.g., scooped, from bins and added to the package. "Bins" are containers that contain ingredients. In some embodiments, each bin contains a unique composition. For example, each bin can contain a single, different ingredient. Alternatively, each bin can contain a mixture of different ingredients, and each mixture can be different in composition than every other mixture. In another embodiment, some bins can contain a single ingredient while other bins can contain a mixture of ingredients.

The total number of ingredients per bin can be, for example, one ingredient per bin, no more than two ingredients per bin, no more than three ingredients per bin, no more than four ingredients per bin, no more than five ingredients per bin, no more than 10 ingredients per bin or no more than 20 ingredients per bin. The number can be, for example, at least two ingredients per bin, at least three ingredients per bin, at least four ingredients per bin, at least five ingredient per bin or at least 10 ingredients per bin. The number can be between one and 10 or three and 15 different ingredients per bin. For example, the number can be one, two, three, four, five, six, seven, eight, nine, 10, 11, 12, 13, 14, 15, 16, 17, 18, 19, or 20 different ingredients per bin.

A "target amount" is an amount of material in a bin, in terms of mass or volume, that contains an ingredient dose of each of one or more ingredients. A target amount can be stated as a volume or as a mass. The calculated amounts can be provided in a database. Where a bin contains a single ingredient, the target amount of an ingredient will be amount of material in the bin that contains the ingredient dose. For example, if the ingredient dose is 10 mg then the target amount also is 10 mg. However, in a situation in which a bin contains more than one ingredient, further calculation is required. Each composition in a bin will have a density, that is, a mass per unit volume. Based on the weight percentage of particular ingredient in a bin that contains a mixture of ingredients, one can calculate the target amount of material in the bin that provides the ingredient dose for the ingredient. So, for example, if an ingredient has an ingredient dose of 10 mg and the ingredient makes up 50% of the mass of material in a bin, then the target amount is 20 mg. Accordingly, a "bin target amount" can be the amount of material in a bin that contains an ingredient dose of each of one or more ingredients in a bin. Bins contents can be determined such that a single target amount contains exactly the ingredient dose of each ingredient in the bin, or such that the target amount contains at least an ingredient dose of some or all of the ingredients. Every ingredient in a bin can be included such that a target amount includes an ingredient dose, such as a recommended daily dose, of every ingredient.

The total number of bins can be, for example, more than 200 or no more than 200. The number can be, for example no more than 100 or no more than 50 or no more than 25. The total number of bins can be between 10 and 200, e.g., between 10 and 100 or between 10 and 50.

VII. Precision Supplements Package

Personalized supplements, probiotics and probiotics are provided to the subject in a "precision supplements package". A precision supplements package typically will include a plurality of dosage forms for ingestion by the subject. A precision supplements package typically will have a predetermined size, that is, a predetermined total amount of supplements, probiotics and probiotics. A precision supplements package is filled with the top-ranked ingredients. This can be done in iterative order beginning with a target amount of the ingredient having the highest utility score and continuing down rank until the package of predetermined size is filled, or nearly filled, or unable to accommodate a full target amount of the next ingredient.

A. Dosage Forms

Customized supplements will be packaged in dosage forms for ingestion by a subject. Many dosage forms are known in the art. These include, without limitation, capsules, tablets, packets (e.g., stick packs), and gummies. Capsules come in various sizes. These include, for example, #000 (1.37 ml), #00 (0.93 ml), #0 (0.68 ml), #1 (0.50 ml), #2 (0.37 ml), #3 (0.30 ml) and #4 (0.21 ml). Packets may be foil packets. They may be tearable to make opening easier. The contents can be poured out, for example, into a beverage.

B. Total Package Amount

Success in taking supplements as a habit can depend on the number and size of dosage forms delivered. Accordingly, a "total package amount" of material can be set for the precision supplements package. The precision supplements package for a daily dose may be one, two, three, four, five, six, seven, eight, nine, 10, 11, 12, 13, 14 or 15. So, for example, the number of dosage forms may be between two and 12, or between six and ten. Subjects may be expected to ingest six to ten dosage forms per day. The number of unit dosage forms can be 8. Accordingly, the total amount of supplements to be taken in a time interval dose, such as a daily dose, can be between about 1 ml and 15 ml. In one embodiment, there are about 8 dosage forms (e.g., capsules), each containing about 720 mg of ingredient. A volume of 0.93 ml (capsule size #00) can accommodate a mass of about 720 mg. Accordingly, a volume of 1 ml. to about 15 ml can be a target mass of about 774 mgs to about 11.61 gms. Target volumes can be converted to target mass using this relationship, mutatis mutandis.

Typically, a subject will receive between 30 and 90 different ingredients.

C. Filling a Total Package Amount

Ingredients/bins can now be selected for inclusion in a precision supplements package. In one embodiment, ingredient/bin selection can involve determining for each ingredient/bin having a positive overall utility score, a target amount of material in a bin in which the ingredient is included that constitutes an ingredient dose of the ingredient. So, for example, a first ingredient may have a recommended daily dose of 1000 mg. It may also be determined that for the bin in which the first ingredient is contained, a volume of 0.50 ml contains 1000 mg of the ingredient. This calculation may be performed for all ingredients, or may be performed in an iterative fashion, beginning with the ingredient rank ordered as having the highest utility score, and continuing through the ingredients in rank order. As discussed, for bins containing more than one ingredient, the target amount can be an amount that contains an ingredient dose of each of a plurality of the ingredients.

A sum amount of ingredients in benefit rank order can then be determined. So, for example, suppose the volumes determined for the top four ingredients are, in order, 0.5 mL, 0.80 mL, 0.25 mL and 0.4 mL. The sum volume of these ingredients would be 0.5 mL, 1.3 mL, 1.55 mL and 1.95 mL, respectively. The set of ingredients in rank order sequence that has the largest sum volume that does not over-fill the target volume is determined. So, for example, suppose the target volume is 1.75 ml. In the above sequence, the series—Ingredient 1, Ingredient 2 and Ingredient 3—has a sum volume of 1.55 ml, which is below the target volume. A series that includes a fourth ingredient would have a sum volume of 1.95 ml, which is above the target volume.

A personalized supplement dose can now be prepared by combining the appropriate volumes of the series ingredients into one or more dosage forms. Thus, the set of ingredients whose sum volume is no greater than the target volume is added to the dose.

If the sum volume is less than the target volume, the excess volume can be dealt with in a number of ways. In some embodiments, this excess volume can be left empty. In other embodiments, additional amounts of recommended ingredients can be added to the sum volume until the target volume is reached. In this case, dose of the marginal volume will be less than the target dose, but would still be expected to provide some benefit. In some embodiments recommended ingredients already added can be added in excess. They can be added based on their rank order of overall utility score. Also, limits can be placed on the total additional volume of ingredients added. For example, no ingredient may be present above 120% of the recommended daily dose.

Similarly, the target may be a target mass rather than a target volume. For example the target mass can be about 5.76 gms, e.g., spread out over 8 dosage forms.

VIII. Computer Systems

Databases and operations on them as provided herein can be executed by programmable digital computer.

Figure 7:
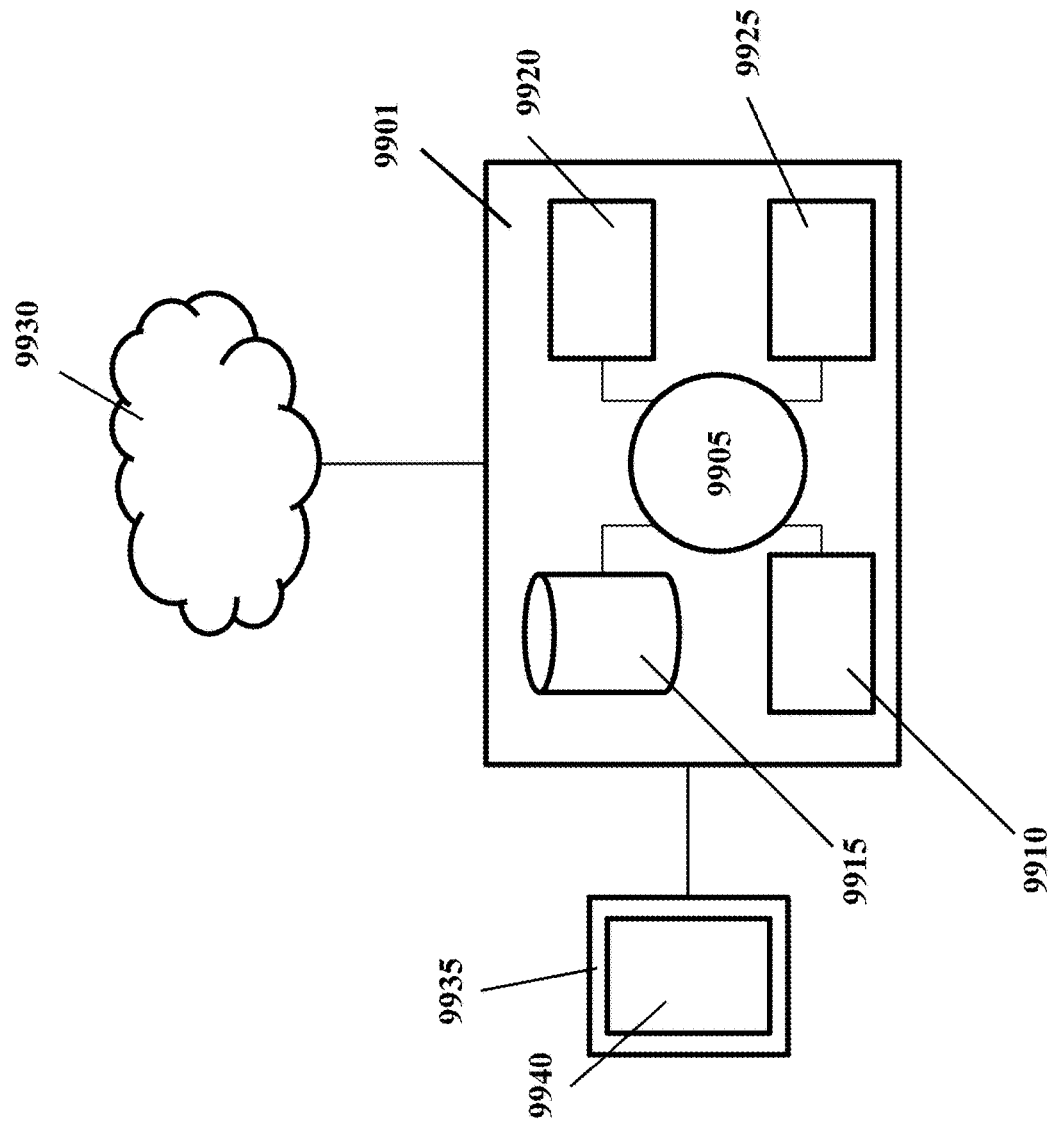
FIG. 7 shows an exemplary computer system.

FIG. 7 shows an exemplary computer system. The computer system 9901 includes a central processing unit (CPU, also "processor" and "computer processor" herein) 9905, which can be a single core or multi core processor, or a plurality of processors for parallel processing. The computer system 9901 also includes memory or memory location 9910 (e.g., random-access memory, read-only memory, flash memory), electronic storage unit 9915 (e.g., hard disk), communication interface 9920 (e.g., network adapter) for communicating with one or more other systems, and peripheral devices 9925, such as cache, other memory, data storage and/or electronic display adapters. The computer readable memory 9910, storage unit 9915, interface 9920 and peripheral devices 9925 are in communication with the CPU 9905 through a communication bus (solid lines), such as a motherboard. The storage unit 9915 can be a data storage unit (or data repository) for storing data. The computer system 9901 can be operatively coupled to a computer network ("network") 9930 with the aid of the communication interface 9920. The network 9930 can be the Internet, an internet and/or extranet, or an intranet and/or extranet that is in communication with the Internet. The network 9930 in some cases is a telecommunication and/or data network. The network 9930 can include one or more computer servers, which can enable distributed computing, such as cloud computing.

The CPU 9905 can execute a sequence of machine-readable instructions, which can be embodied in a program or software. The instructions may be stored in a memory location, such as the computer readable memory 9910. The instructions can be directed to the CPU 9905, which can subsequently program or otherwise configure the CPU 9905 to implement methods of the present disclosure.

The storage unit 9915 can store files, such as drivers, libraries and saved programs. The storage unit 9915 can store user data, e.g., user preferences and user programs. The computer system 9901 in some cases can include one or more additional data storage units that are external to the computer system 9901, such as located on a remote server that is in communication with the computer system 9901 through an intranet or the Internet.

The computer system 9901 can communicate with one or more remote computer systems through the network 9930.

Methods as described herein can be implemented by way of machine (e.g., computer processor) executable code stored on an electronic storage location of the computer system 9901, such as, for example, on the computer readable memory 9910 or electronic storage unit 9915. The machine executable or machine-readable code can be provided in the form of software. During use, the code can be executed by the processor 9905. In some cases, the code can be retrieved from the storage unit 9915 and stored on the memory 9910 for ready access by the processor 9905. In some situations, the electronic storage unit 9915 can be precluded, and machine-executable instructions are stored on memory 9910.

Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks.

The computer system 9901 can include or be in communication with an electronic display 9935 that comprises a user interface (UI) 9940 for providing, for example, input parameters for methods described herein. Examples of UIs include, without limitation, a graphical user interface (GUI) and web-based user interface.

Processes described here can be performed using one or more computer systems that can be networked together. Calculations can be performed in a cloud computing system in which data on the host computer is communicated through the communications network to a cloud computer that performs computations and that communicates, or outputs results to a user through a communications network. For example, benefit measures can be transmitted to a cloud computing system where a utility score algorithm performs one or more operations of the methods described herein. At any step cloud computing system can transmit results of calculations back to the computer operated by the user.

Data can be transmitted electronically, e.g., over the Internet. Electronic communication can be, for example, over any communications network include, for example, a high-speed transmission network including, without limitation, Digital Subscriber Line (DSL), Cable Modem, Fiber, Wireless, Satellite and Broadband over Powerlines (BPL). Information can be transmitted to a modem for transmission, e.g., wireless or wired transmission, to a computer such as a desktop computer. Alternatively, reports can be transmitted to a mobile device. Reports may be accessible through a subscription program in which a user accesses a website which displays the report. Reports can be transmitted to a user interface device accessible by the user. The user interface device could be, for example, a personal computer, a laptop, a smart phone or a wearable device, e.g., a watch, for example worn on the wrist.

IX. Robots

Also provided herein are robot systems for filling personalized dosage packages. Robots can have an arm that moves in three dimensions (e.g., x-y-z axes). The arm is powered by a motor and is under the control of computer software. The robot can be loaded with bins containing ingredients and with dosage forms, such as capsules or packets, that are open to receive material from the bins. Alternatively, the bins can be loaded on a conveyer that conveys the bins to a loading station. Computer software can be programmed to collect, e.g., scoop, a desired amount of material from each of a set of selected bins, and deposit the material into the dosage form containers.

X. Delivery

Subjects can order precision supplement packages for personal use. Ordering can be done over the internet. The subject will have provided information and materials for processing to identify suboptimal health categories. Upon ordering, precision supplement packages can be delivered by common carrier, such as a national postal service, UPS or FedEx. A package for delivery can contain a plurality of precision supplement packages, each configured for consumption on a time schedule, such as daily. In one embodiment, the package for delivery can contain sufficient dosages for a supply of at least one week or at least one month. The contents of a precision supplement package can then be administered to the subject, according to the schedule.

EXEMPLARY EMBODIMENTS

1. A method comprising:
  a) providing a list of ingredients, wherein each ingredient in the list provides a benefit in one or a plurality of different wellness categories;
  b) identifying a set comprising a plurality of suboptimal wellness categories;
  c) rank ordering ingredients in the list, or mixtures of ingredients in the list, according to level of benefit to the set of suboptimal wellness categories; and
  d) preparing a package including a plurality of the ingredients or mixtures of ingredients, wherein the ingredients or mixture of ingredients included are chosen in rank order from most to least level of benefit.

2. The method of embodiment 1, wherein the set of suboptimal wellness categories is identified from an animal, e.g., human, subject.

3. The method of embodiment 1, wherein the list comprises at least any of 10, 25, 50, 100 or 200 different ingredients.

4. The method of embodiment 1, wherein the package comprises at least any of the top 2, 3, 4, 5, 6, 7, 8, 9, 10, 15, 20, 30, 50 or 100 highest ranked ingredients or mixtures of ingredients.

5. The method of embodiment 1, wherein the list comprises at least 50 different ingredients and the package includes at least 10 different ingredients.

6. The method of embodiment 4, wherein a plurality of the ingredients are included in the package in reference daily intake amounts.

7. The method of embodiment 1, comprising preparing a package for each of a plurality of different sets of suboptimal wellness categories, e.g., different subjects.

8. The method of embodiment 1, comprising preparing a package for each of a plurality of different subjects, wherein a total package amount is the same for all of the subjects.

9. The method of embodiment 1, wherein the package comprises a plurality of containers.

10. A method comprising:
  a) providing a list of wellness categories characterized as suboptimal in a subject;
  b) a providing a database comprising, for each of a plurality of ingredients, a benefit measure for each of the suboptimal wellness categories;
  c) providing a plurality of bins, each bin containing a different ingredient or combination of ingredients;
  d) determining, for each bin, a bin utility score, wherein the bin utility score is a function of the benefit measures for the suboptimal wellness categories of each ingredient in the bin, and, optionally, a bin target amount of material in the bin, wherein the bin target amount comprises an ingredient dose of one or more of the ingredients;
  f) identifying one or more ingredient sets, each ingredient set comprising material from each of a plurality of the bins, wherein the sum of the bin target amounts of material in the set is no greater than a total package amount, and wherein the materials in the set are selected from the bins in rank order beginning with the bin having the highest utility score; and
  g) filling one or more dosage forms with target amounts of the ingredients from the bins to produce a precision supplements package.

11. The method of embodiment 10, wherein operations a) through f) are performed by a programmable digital computer.

12. The method of embodiment 10, wherein the plurality of ingredients is at least 50, at least 100 or at least 200 ingredients.

13. The method of embodiment 10, wherein the ingredients are classified into categories selected from prebiotics, vitamins, minerals, amino acids, enzymes, coenzymes lipids, botanicals, food extracts, seed and root extracts herbs, herbal extracts, and probiotics.

14. The method of embodiment 13, wherein the ingredient set comprises ingredients from a plurality of different categories.

15. The method of embodiment 10, wherein wellness categories are selected from phenotypic categories, health functions, functional categories, biochemical pathways or a combination of these.

16. The method of embodiment 10, wherein the benefit measure is a tiered measure, optionally including a "no benefit" measure or a "contraindicated" measure.

17. The method of embodiment 10, wherein the utility score is designated as "contraindicated" if an ingredient in the bin is contraindicated for any suboptimal wellness category.

18. The method of embodiment 10, wherein each bin contains only one ingredient.

19. The method of embodiment 10, wherein each bin contains a plurality of different ingredients.

20. The method of embodiment 10, wherein the target amount contains an ingredient dosage, e.g., a reference daily intake.

21. The method of embodiment 20, wherein the reference daily intake is a U.S. Food and Drug Administration reference daily intake.

22. The method of embodiment 10, wherein the bin utility score is further a function of a measure of dosage confidence.

23. The method of embodiment 10, wherein the set of ingredients is selected such that the addition of a target amount from the next bin in the rank ordered list of ingredients would put the sum of the target amounts greater than the total package amount.

24. The method of embodiment 10, wherein the sum of target amounts is less than the total package amount, and the amount difference is filled with material from a previously selected bin, provided that the resulting amount contains no more than 125% of the RDI for any ingredient.

25. The method of embodiment 10, wherein the one or more dosage forms is a plurality of dosage forms.

26. The method of embodiment 10, wherein the dosage forms comprise one or more of a capsule, a tablet, a gummy, a stick pack (e.g., pixie stick), a blister pack and a packet.

27. The method of embodiment 10, comprising producing a plurality of precision supplement packages for the same or different subjects.

28. The method of embodiment 27, wherein the plurality of packages are for each of a plurality of different subjects having different suboptimal wellness category profiles.

29. A dosage form comprising one or more containers, wherein the dosage form comprises a precision supplement package prepared according to the method of embodiment 10.

30. The dosage form of embodiment 29, comprising between 5 and 15 separate containers.

31. The dosage form of embodiment 30, wherein the containers comprise capsules and/or packets.

32. A system comprising:
(a) a computer comprising:
   (i) a processor; and
   (II) a memory, coupled to the processor, the memory storing a module comprising:
      (1) a database comprising, for each of a plurality of ingredients, a benefit measure for each of a plurality of wellness categories;
      (2) data from a subject including one or a plurality of wellness categories for which the subject has a suboptimal score;
      (3) an algorithm which, when executed, calculates for each of a plurality of bins comprising a different ingredient or combination of ingredients, a utility score, wherein the bin utility score is a function of the benefit measures for the suboptimal wellness categories of each ingredient in the bin, and a target amount of material in the bin, wherein the target amount comprises an ingredient dose of one or more of the ingredients;
      (5) an algorithm which, when executed, determines one or more ingredient sets, each ingredient set comprising material from each of a plurality of the bins, wherein the sum of the target amounts of material in the set is no greater than a total package amount, and wherein the materials in the set are selected from the bins in rank order beginning with the bin having the highest utility score; and
      (6) computer executable instructions for implementing the algorithms.

33. The system of embodiment 32, wherein any amount difference between the sum amount and the target amount is either:
(i) not filled;
(ii) filled with the next rank ordered ingredient; or
(iii) filled with one or more previously used ingredient.

34. The system of embodiment 32, further comprising, in memory:
(A) a transcriptome database comprising transcriptome data from somatic cells of the subject and microbiome metatranscriptome data from a microbiome of the subject;
(B) an algorithm that calculates, from data in the transcriptome database, activity scores for a plurality of wellness categories, including pathways and integrative functions; and
(C) an algorithm that identifies wellness categories that are suboptimal in the subject.

35. A robot comprising:
(a) a computer system of embodiment 32;
(b) a plurality of bins, each bin containing a different ingredient or combination of ingredients than every other bin;
(c) a plurality of containers configured as dosage forms; and
(d) a motorized movable arm under control of the computer system configured to collect amounts of material from the bins and deposit them into the dosage forms;
wherein the computer system is further programmed to deposit amounts of material into the dosage forms corresponding to target amounts of material from each bin.

36. A method comprising administering to a subject a precision supplement package, wherein the precision supplement package includes a plurality of ingredients, wherein the ingredients benefit a plurality of suboptimal wellness category in the subject.

37. The method of embodiment 36, wherein the ingredients comprise a series of top-ranked ingredients from a list of ingredients rank-ordered for overall benefit to the plurality of suboptimal wellness conditions.

38. The method of embodiment 36, comprising administering the package on each of at least 60 days, at least 70 days, at least 80 days or at least 90 days over a three month period.

39. The method of embodiment 36, comprising administering the package on each of at least 90 days, at least 100 days, at least 110 days, at least 120 days, at least 130 days, at least 140 days, at least 150 days, at least 160 days, at least 170 days, or at least 180 days over a six month period.

40. A method comprising:
a) a providing a database comprising, for each of a plurality of ingredients, a benefit measure for each of a plurality of wellness categories;
b) providing a list of wellness categories characterized as suboptimal in a subject;
c) determining, for each ingredient, a utility score, wherein the utility score is a function of the benefit measures for the suboptimal wellness categories;
d) providing a plurality of bins, each bin containing a different ingredient or combination of ingredients;
e) determining, for each of a plurality of the ingredients, a target amount of material in a bin containing an ingredient dose of the ingredient;

f) identifying one or more ingredient sets, each ingredient set comprising a plurality of ingredients, wherein the sum of the target amounts of the ingredients in the set is no greater than a total package amount, and wherein the ingredients in the set are selected from the list of ingredients in rank order beginning with the ingredient having the highest utility score; and g) filling one or more dosage forms with target amounts of the ingredients from the bins to produce a precision supplements package.

41. A method comprising:
a) selecting a total package amount for a personalized supplements package; and
b) filling the total package amount with ingredients, wherein the ingredients are selected from highest ranking ingredients in a set of rank ordered ingredients, wherein ranking is based on degree of benefit to a subject in a plurality of suboptimal wellness categories of the subject.

42. The method of embodiment 41, comprising filling the total package amount with ingredients selected for a second subject having different suboptimal wellness categories.

EXAMPLES

I. Example 1

Referring to FIG. 1, stool and blood samples are collected from four subjects. In each case, messenger RNA is collected from the samples and sequenced to produce microbiome meta-transcriptomic data and host somatic cell transcriptomic data. The data is analyzed to determine scores for each of several functional activities and each of several pathway activities. The scores are further analyzed to determine whether they are in the normal range or are suboptimal. The resulting data set, presented in FIG. 3, presents for each subject, and for each wellness category, a measure indicating normal range or suboptimal range.

Referring to FIG. 4, a database is also provided that indicates for each of a number of ingredients and each wellness category, a utility score indicating the level of benefit the ingredient provides to the wellness category. In this example, utility scores can be, from most beneficial to least beneficial, "Strong Recommend", "Recommend", No Benefit (indicated with a "–") and "Contraindicated".

Referring to FIG. 5, each individual, suboptimal wellness categories are identified. In this example, results for "Subject 1" are shown. For each ingredient, an overall utility score is calculated. In this example, "Strong Recommend" is scored as 2, "Recommend" is scored as 1, "no benefit" is scored as 0 and "Contraindicated" is scored as a trump category of –1. In this example, for each ingredient, the score or scores for suboptimal wellness categories are added to provide an overall utility score. In some embodiments, scores can be weighted based on particular category.

So, for example, referring to FIG. 5, Subject 1 has suboptimal scores for functional activity condition 2, Pathway condition 1, Pathway activity condition 2 and Pathway activity condition m. The overall utility scores are calculated in the far-right column. It is noted that for ingredient q, even though the ingredient is recommended or strongly recommended for four of the suboptimal wellness categories, it is contraindicated for one of the suboptimal wellness categories. The contraindication outranks any other recommendation. Therefore, ingredient q receives an overall utility score of "eliminate".

Referring to FIG. 6, for the subject, the ingredients are now rank ordered from highest to lowest in terms of overall utility score. In this example, for Subject 1, the rank order is: Ingredient 2 (score 6), ingredient 1 (score 4), ingredient 4 (score 3), Ingredient 5 (score 2), Ingredient 3 (score 0) and Ingredient q (score "eliminate").

For each ingredient, also, the recommended daily dose in milligrams is provided, as is the density of the ingredient in the bin in which it is kept. From these numbers, the volume of material from the bin that constitutes a daily dose and milliliters also is calculated. The cumulative sum of the ingredients in rank order is determined. A target dose volume is also selected. In this case the target volume is 3 mL. Now, the sequence of ingredients that fit within the target volume can be identified. In this case, Ingredients 2, 1 and 4 have a sum volume of 2 mL which is within the target volume of 3 mL. However, the addition of 1.5 mL of ingredient five, the daily recommended dose, would bring the sum of volume to 3.5 mL, which is above the target volume of 3 mL. In this example, only 1 mL of Ingredient 5 is added to the sum volume to raise that volume to the target volume of 3 mL.

Material from bins containing the ingredients selected are formulated into dosage forms. In this example, the material is divided among six #1 size capsules, each capsule having a volume of 0.5 mL, for a total volume of 3 mL. This constitutes a daily dose of supplements customized for the subject.

II. Example 2

Figure 8:
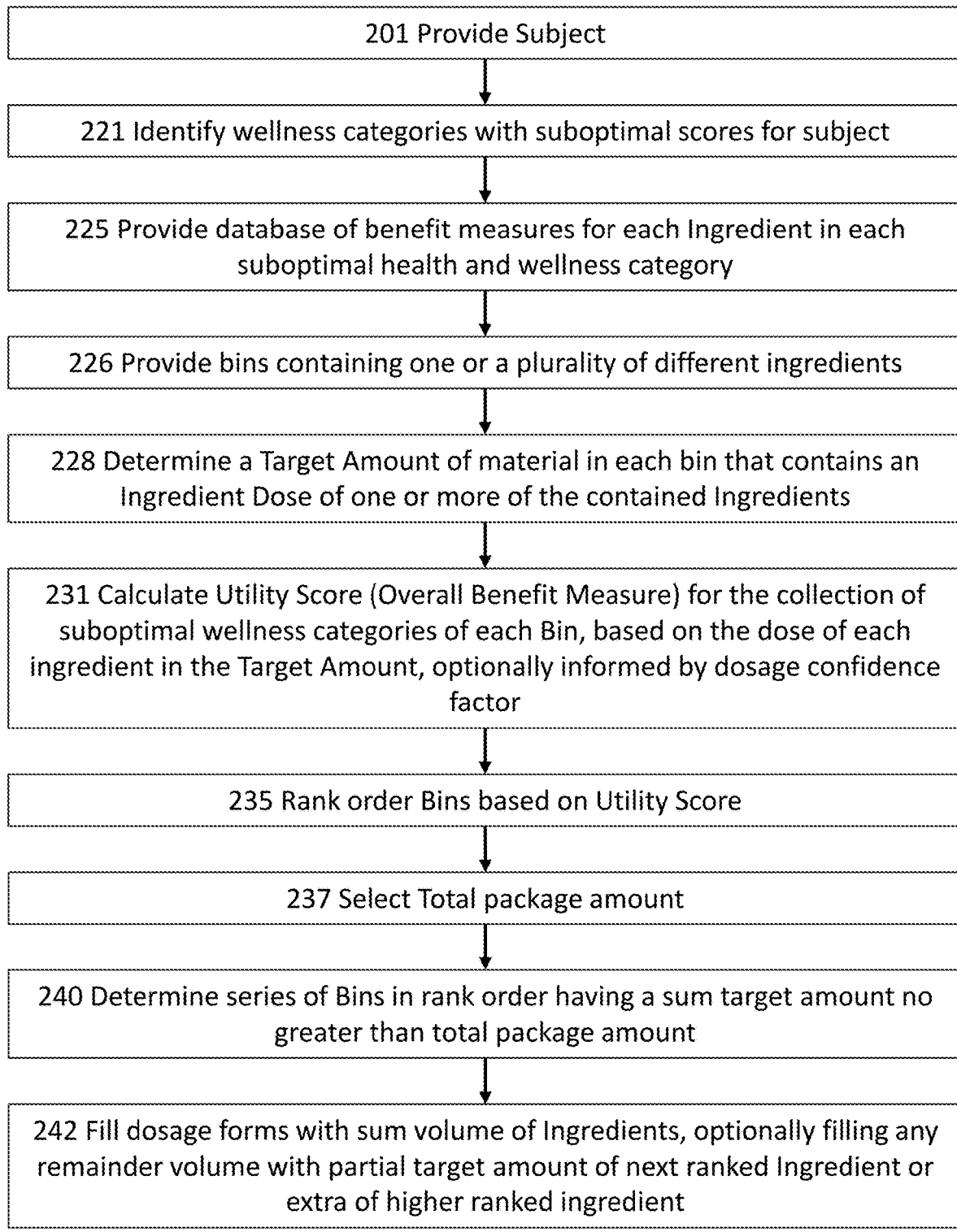
FIG. 8 shows a flow chart of an exemplary method of preparing a supplements package using bin utility scores.

Referring to FIGS. 8 and 9, suboptimal wellness categories for a subject are identified. Bins 1-q are provided. Each bin contains a different combination of ingredients. (For example, Bin 1 contains ingredients 1, 2 and 3.) A target amount of material in each bin contains a recommended daily intake of each ingredient. For each ingredient in each bin, a benefit measure is assigned to each suboptimal wellness category. Ingredient 2 in Bin 1 has a benefit measure of "Strong Recommend" for Condition 1. However, scientific literature suggests that for full benefit for Condition 1, the dose is significantly greater than the dose of Ingredient 2 in the target amount for Bin 1. Accordingly, the benefit measure is adjusted to "Recommend". Similarly for Ingredient 6 and Condition 2, the benefit measure is adjusted downward. Based on the adjusted benefit measures, a Bin Utility Score is determined. In this example, Bin 1 has a utility score of 7, while Bin 2 has a utility score of 5. Bin 3 has a utility score of 0, reflecting a contraindicated benefit measure of Ingredient q for Condition 3. Accordingly, bins are rank ordered: Bin 1, Bin 2. It is determined that the sum of target amounts from Bin 1 and Bin 2 fill 80% of the total package amount. Accordingly, target amounts of each bin are proportionately increased so that the total sum amount equals the total package amount. Dosage forms are filled with the adjusted target amounts.

As used herein, the following meanings apply unless otherwise specified. The word "may" is used in a permissive sense (i.e., meaning having the potential to), rather than the mandatory sense (i.e., meaning must). The words "include", "including", and "includes" and the like mean including, but not limited to. The singular forms "a," "an," and "the" include plural referents. Thus, for example, reference to "an element" includes a combination of two or more elements, notwithstanding use of other terms and phrases for one or more elements, such as "one or more." The phrase "at least one" includes "one", "one or more", "one or a plurality" and "a plurality". The term "or" is, unless indicated otherwise, non-exclusive, i.e., encompassing both "and" and "or." The term "any of" between a modifier and a sequence means that the modifier modifies each member of the sequence. So, for example, the phrase "at least any of 1, 2 or 3" means "at least 1, at least 2 or at least 3". The term "about" refers to a range that is 5% plus or minus from a stated numerical value within the context of the particular usage. So, for example, "about 100" means between 95 and 105. The term "consisting essentially of" refers to the inclusion of recited elements and other elements that do not materially affect the basic and novel characteristics of a claimed combination.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

All publications, patents, and patent applications mentioned in this specification are herein incorporated by reference to the same extent as if each individual publication, patent, or patent application was specifically and individually indicated to be incorporated by reference.

What is claimed is:

1. A method comprising:
   a) preparing a biological sample from a subject for analysis by isolating a plurality of nucleic acids from the biological sample comprising nucleic acids of microbial origin and nucleic acids of human origin and sequencing the plurality of nucleic acids of microbial origin and nucleic acids of human origin, thereby generating a prepared sample comprising a plurality of sequencing reads of human origin and of microbial origin from the biological sample;
   b) performing an analysis of the plurality of sequencing reads of human origin and of microbial origin obtained from the prepared biological sample in a computer program by aligning the plurality of sequence reads to a reference catalog and identifying a taxonomic classification for the plurality of sequencing reads of human origin and of microbial origin, thereby providing an output of the analysis;
   c) identifying a subset of wellness categories from a plurality of different wellness categories by associating the output of the analysis to one or more biochemical pathway(s) or one or more activity pathway(s) in a database;
   d) providing a list of ingredients based on a level of benefit assigned to each ingredient for each of the plurality of different wellness categories, wherein each ingredient in the list provides a benefit in one or more of the plurality of different wellness categories;
   e) rank ordering ingredients in the list, or mixtures of ingredients in the list, according to the level of benefit to the subset of different wellness categories; and
   f) preparing a package including a plurality of the ingredients or mixtures of ingredients, wherein the ingredients or mixture of ingredients included are chosen in rank order from most to least level of benefit to the subject based on the biological sample.

2. The method of claim 1, wherein the list comprises at least 50 different ingredients.

3. The method of claim 1, wherein the package comprises at least any of the top 10, highest ranked ingredients or mixtures of ingredients.

4. The method of claim 3, wherein a plurality of the ingredients are included in the package in reference daily intake amounts.

5. The method of claim 1, wherein the list comprises at least 50 different ingredients and the package includes at least 10 different ingredients.

6. The method of claim 1, comprising preparing a package for each of a plurality of different subjects, each having a set of different wellness categories.

7. The method of claim 6, wherein a total package amount is the same for all of the subjects.

8. The method of claim 1, wherein the package comprises a plurality of containers.

9. The method of claim 1, wherein at least four biochemical pathways are selected from the categories selected from the group consisting of butyrate production pathways, LPS biosynthesis pathways, methane gas production pathways, sulfide gas production pathways, flagellar assembly pathways, ammonia production pathways, putrescine production pathways, oxalate metabolism pathways, uric acid production pathways, salt stress pathways, biofilm chemotaxis in virulence pathways, mitochondrial biogenesis pathways, energy production pathways, TMA production pathways, primary bile acid pathways, secondary bile acid pathways, acetate pathways, propionate pathways, branched chain amino acid pathways, long chain fatty acid metabolism pathways, long chain carbohydrate metabolic pathways, cadaverine production pathways, tryptophan pathways, starch metabolism pathways, and fucose metabolism pathways.

10. The method of claim 1, wherein the biological sample collected from the subject comprises a gut microbiome of the subject and nucleic acids of human origin from the subject.

11. The method of claim 1, wherein the computer program is trained on an algorithm that comprises a plurality of models.

12. The method of claim 1, wherein the biological sample collected from the subject comprises an oral microbiome of the subject and nucleic acids of human origin from the subject.

13. A method comprising:
   a) preparing a biological sample from a subject for analysis by isolating a plurality of nucleic acids from the biological sample comprising nucleic acids of microbial origin and nucleic acids of human origin and sequencing the plurality of nucleic acids of microbial origin and nucleic acids of human origin, thereby generating a prepared sample comprising a plurality of sequencing reads of human origin and of microbial origin from the biological sample;

b) performing an analysis of the plurality of sequencing reads of human origin and of microbial origin obtained from the prepared biological sample in a computer program by aligning the plurality of sequence reads to a reference catalog for identifying a taxonomic classification for each sequencing read in the plurality of sequencing reads of human origin and of microbial origin, thereby providing an output of the analysis;

c) identifying a subset of wellness categories from a plurality of different wellness categories by associating the output of the analysis to one or more biochemical or activity pathway in a database;

d) providing a plurality of bins, each bin containing a different ingredient or combination of ingredients;

e) determining, for each bin, a bin utility score, wherein the bin utility score indicates a collective benefit of the ingredient or ingredients in the bin for the identified subset of wellness categories;

f) determining, for a plurality of the bins, bin target amounts of ingredient or ingredients in a bin forming a dose;

g) rank ordering the bins from highest to lowest bin utility score;

h) identifying an ingredient set of ingredients from bins in the rank order, wherein the ingredient set is based on a sum amount of target bin amounts, wherein:
  i) the sum amount is no greater than a predetermined total package amount;
  ii) the sum amount is determined by adding the bin target amounts of the bins in the set selected from the bins in rank order, until adding the bin target amount of the next bin in the rank order would exceed the predetermined total package amount; and i) filling one or more dosage forms with bin target amounts of the ingredients from the bins in the ingredient set, to produce a precision supplements package.

14. The method of claim 13, wherein operations a) through i) are performed by a programmable digital computer.

15. The method of claim 13, wherein the combination of ingredients comprise a plurality of ingredients of at least 50 ingredients.

16. The method of claim 13, wherein the different ingredients are classified into categories selected from prebiotics, vitamins, minerals, amino acids, enzymes, coenzymes lipids, botanicals, food extracts, seed and root extracts herbs, herbal extracts, and probiotics.

17. The method of claim 13, wherein the plurality of different wellness categories further comprise one or more categories selected from phenotypic categories, health functions, and functional categories.

18. The method of claim 13, wherein the collective benefit is a tiered measure.

19. The method of claim 13, wherein the utility score is designated as contraindicated if an ingredient in the bin is contraindicated for any of the identified subset of wellness categories.

20. The method of claim 13, wherein each bin contains only one ingredient.

21. The method of claim 13, wherein each bin contains a plurality of different ingredients.

22. The method of claim 13, wherein the bin target amount contains a reference daily intake.

23. The method of claim 22, wherein the reference daily intake is a U.S. Food and Drug Administration reference daily intake.

24. The method of claim 13, wherein the bin utility score is further a function of a measure of dosage confidence.

25. The method of claim 13, wherein the sum of target amounts is less than the total package amount, and the amount difference is filled with material from a previously selected bin, provided that the resulting amount contains no more than 125% of the RDI for any ingredient.

26. The method of claim 13, wherein the one or more dosage forms is a plurality of dosage forms.

27. The method of claim 13, wherein the dosage forms comprise one or more of a capsule, a tablet, a gummy, a stick pack, a blister pack and a packet.

28. The method of claim 13, comprising producing a plurality of precision supplement packages for the same or different subjects.

29. The method of claim 28, wherein the plurality of packages are for each of a plurality of different subjects having different wellness category profiles.

30. The method of claim 13, wherein at least four biochemical pathways are selected from the categories selected from the group consisting of butyrate production pathways, LPS biosynthesis pathways, methane gas production pathways, sulfide gas production pathways, flagellar assembly pathways, ammonia production pathways, putrescine production pathways, oxalate metabolism pathways, uric acid production pathways, salt stress pathways, biofilm chemotaxis in virulence pathways, mitochondrial biogenesis pathways, energy production pathways, TMA production pathways, primary bile acid pathways, secondary bile acid pathways, acetate pathways, propionate pathways, branched chain amino acid pathways, long chain fatty acid metabolism pathways, long chain carbohydrate metabolic pathways, cadaverine production pathways, tryptophan pathways, starch metabolism pathways, and fucose metabolism pathways.

31. The method of claim 13, wherein the plurality of different wellness categories further comprise one or more of abdominal weight, gastroesophageal reflux disease (GERD), acne, GI Inflammation, attention deficit disorder, headache condition, allergy, hypo glycemia, allergy ENT condition, hypo thyroid condition, allergy lung condition, infection condition, allergy skin condition, insomnia, anxiety leaky gut condition, auto immune liver condition, autoimmune gut condition, lung condition, autoimmune joint condition, autoimmune skin condition, muscle condition, cardiovascular condition, nerve condition, depression, nutritional deficiency, diverticular condition obesity, dysbiosis, overweight, dysglycemia (hyperglycemia), small intestinal bacterial overgrowth, dysmotility thyroid condition, ENT condition, eye condition, food reaction, glaucoma, macular degeneration, hearing loss, stroke, alzheimer's, multiple sclerosis, parkinson's disease, high blood pressure, cardiomyopathy, chronic obstructive pulmonary disease, type I diabetes, type II diabetes, cancer, hepatitis, pancreatitis, kidney disease, inflammatory bowel disease, and Crohn's disease fatigue.

32. The method of claim 13, wherein the biological sample collected from the subject comprises a gut microbiome of the subject and nucleic acids of human origin from the subject.

33. The method of claim 13, wherein the computer program is trained on an algorithm that comprises a plurality of models.

34. The method of claim 13, wherein the biological sample collected from the subject comprises an oral microbiome of the subject and nucleic acids of human origin from the subject.

* * * * *